(12) United States Patent
Fujii

(10) Patent No.: US 11,394,866 B2
(45) Date of Patent: Jul. 19, 2022

(54) SIGNAL PROCESSING DEVICE, IMAGING DEVICE, SIGNAL PROCESSING METHOD AND PROGRAM

(71) Applicant: Sony Group Corporation, Tokyo (JP)

(72) Inventor: Shinichi Fujii, Kanagawa (JP)

(73) Assignee: Sony Group Corporation, Tokyo (JP)

(*) Notice: Subject to any disclaimer, the term of this patent is extended or adjusted under 35 U.S.C. 154(b) by 128 days.

(21) Appl. No.: 16/635,613

(22) PCT Filed: May 8, 2018

(86) PCT No.: PCT/JP2018/017779
§ 371 (c)(1),
(2) Date: Jan. 31, 2020

(87) PCT Pub. No.: WO2019/031000
PCT Pub. Date: Feb. 14, 2019

(65) Prior Publication Data
US 2020/0244893 A1    Jul. 30, 2020

(30) Foreign Application Priority Data

Aug. 9, 2017  (JP) .............................. JP2017-153980

(51) Int. Cl.
*H04N 5/232* (2006.01)
*G02B 7/34* (2021.01)
(Continued)

(52) U.S. Cl.
CPC ......... *H04N 5/232122* (2018.08); *G02B 7/34* (2013.01); *G03B 13/20* (2013.01); *G03B 13/36* (2013.01)

(58) Field of Classification Search
CPC ..... H04N 5/232122; H04N 2005/2255; H04N 5/23206; H04N 5/36961; G02B 7/34;
(Continued)

(56) References Cited

U.S. PATENT DOCUMENTS

2011/0228053 A1* 9/2011 Aoki .................... H04N 13/218
                                                              348/49
2012/0212662 A1* 8/2012 Shimoda ................ G03B 13/36
                                                              348/349

(Continued)

FOREIGN PATENT DOCUMENTS

JP     2015-049402 A    3/2015
JP     2015043026 A     3/2015
(Continued)

OTHER PUBLICATIONS

Japanese Office Action dated Feb. 15, 2022 for corresponding for corresponding Japanese Application No. 2019-535595.

*Primary Examiner* — Shahbaz Nazrul
(74) *Attorney, Agent, or Firm* — Michael Best & Friedrich LLP

(57) ABSTRACT

Provided is a signal processing device including a control unit that acquires distance measurement information on the basis of an addition value obtained by adding together outputs of a plurality of phase difference detection pixels supplied from an imaging element in which the plurality of phase difference detection pixels different in phase difference characteristic is arranged.

20 Claims, 14 Drawing Sheets

(51) Int. Cl.
*G03B 13/20* (2021.01)
*G03B 13/36* (2021.01)

(58) Field of Classification Search
CPC ............ G02B 23/2423; G02B 23/2438; G02B 23/2484; G02B 23/26; G03B 13/20; G03B 13/36
See application file for complete search history.

(56) References Cited

U.S. PATENT DOCUMENTS

| | | | | |
|---|---|---|---|---|
| 2013/0120644 | A1* | 5/2013 | Fujii | H01L 27/14601 348/349 |
| 2015/0281556 | A1* | 10/2015 | Hamano | H04N 5/232122 348/353 |
| 2016/0035099 | A1* | 2/2016 | Kawamura | H04N 5/232122 382/103 |
| 2016/0353010 | A1* | 12/2016 | Tanaka | H04N 5/36961 |
| 2020/0169704 | A1* | 5/2020 | Fujii | H01L 27/14609 |

FOREIGN PATENT DOCUMENTS

| | | |
|---|---|---|
| JP | 2017129788 A | 7/2017 |
| WO | 2016038766 A1 | 3/2016 |
| WO | 2017111171 A1 | 6/2017 |

\* cited by examiner

PHASE DIFFERENCE DETECTION PIXEL A     PHASE DIFFERENCE DETECTION PIXEL B

PHASE DIFFERENCE DETECTION PIXEL A     PHASE DIFFERENCE DETECTION PIXEL B

FIG. 7
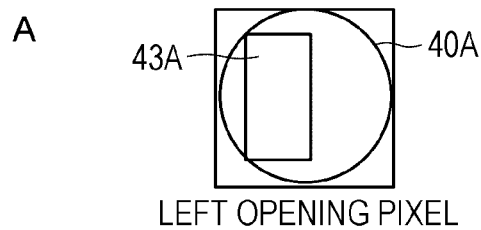
A LEFT OPENING PIXEL
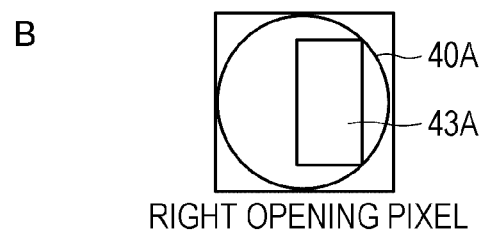
B RIGHT OPENING PIXEL
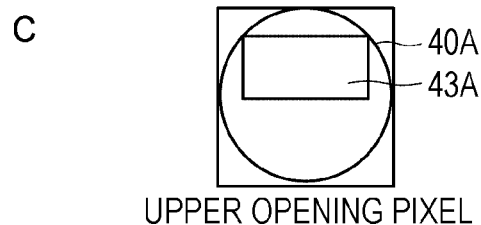
C UPPER OPENING PIXEL
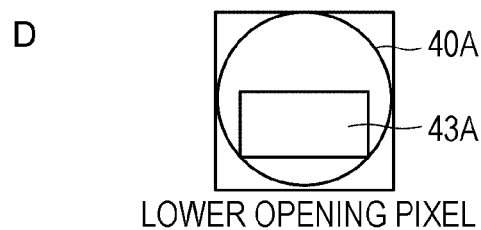
D LOWER OPENING PIXEL
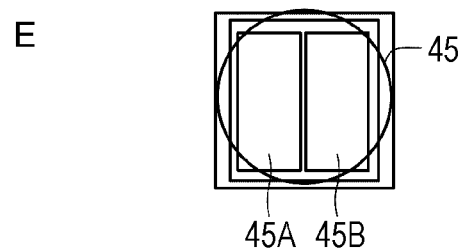
E

SIGNAL PROCESSING DEVICE, IMAGING DEVICE, SIGNAL PROCESSING METHOD AND PROGRAM

TECHNICAL FIELD

The present disclosure relates to a signal processing device, an imaging device, a signal processing method, and a program.

BACKGROUND ART

An image plane phase difference method has been devised as one of methods for detecting a focus (see, for example, Patent Document 1 below). In the image plane phase difference method, phase difference detection pixels for detecting the focus is arranged on the same imaging element, separately from normal pixels.

CITATION LIST

PATENT DOCUMENT

Patent Document 1: Japanese Patent Application Laid-Open No. 2015-49402

SUMMARY OF THE INVENTION

Problems to be Solved by the Invention

In the image plane phase difference method, it is desired to improve focus detection accuracy.

An object of the present disclosure is to provide a signal processing device, an imaging device, a signal processing method, and a program capable of improving focus detection accuracy.

Solutions to Problems

The present disclosure is, for example, a signal processing device including a control unit that acquires distance measurement information on the basis of an addition value obtained by adding together outputs of a plurality of phase difference detection pixels supplied from an imaging element in which the plurality of phase difference detection pixels different in phase difference characteristic is arranged.

The present disclosure is, for example, an imaging device including:

an imaging optical system;

an imaging element in which a plurality of phase difference detection pixels different in phase difference characteristic and irradiated with light captured by the imaging optical system is arranged; and a control unit that acquires distance measurement information on the basis of an addition value obtained by adding together outputs of the plurality of phase difference detection pixels supplied from the imaging element.

The present disclosure is, for example, a signal processing method including acquiring, by a control unit, distance measurement information on the basis of an addition value obtained by adding together outputs of a plurality of phase difference detection pixels supplied from an imaging element in which the plurality of phase difference detection pixels different in phase difference characteristic is arranged.

The present disclosure is, for example, a program causing a computer to execute a signal processing method including acquiring, by a control unit, distance measurement information on the basis of an addition value obtained by adding together outputs of a plurality of phase difference detection pixels supplied from an imaging element in which the plurality of phase difference detection pixels different in phase difference characteristic is arranged.

Effects of the Invention

According to at least the embodiment of the present disclosure, it is possible to improve focus detection accuracy. Note that, the effect described here is not necessarily limited, and may be any effect described in the present disclosure. Furthermore, the contents of the present disclosure are not to be construed as being limited by the exemplified effect.

BRIEF DESCRIPTION OF DRAWINGS

FIGS. 7A to 7E are diagrams for explaining a plurality of examples of the phase difference detection pixels.

MODE FOR CARRYING OUT THE INVENTION

Hereinafter, an embodiment and the like of the present disclosure will be described with reference to the drawings. Note that, description will be made in the following order.

<1. One embodiment>
<2. Modifications>
<3. Application example>

The embodiment and the like described below are preferred specific examples of the present disclosure, and the contents of the present disclosure are not limited to the embodiment and the like.

1. ONE EMBODIMENT

[Configuration Example of Imaging Device]

Figure 1:
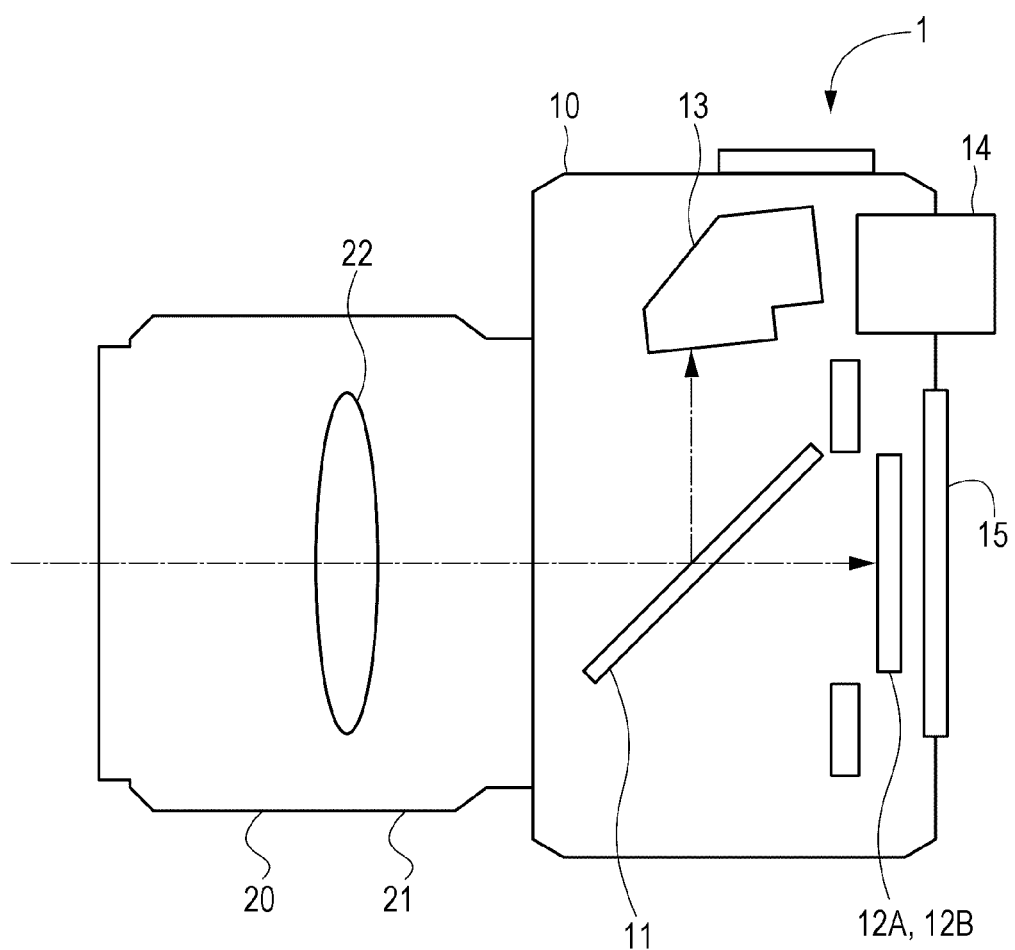
FIG. 1 is a schematic cross-sectional view illustrating a configuration example of an imaging device according to an embodiment of the present disclosure.

First, a configuration example will be described of an imaging device according to an embodiment of the present disclosure. FIG. 1 is a schematic cross-sectional view illustrating a schematic configuration of an imaging device 1 according to the embodiment of the present disclosure.

The imaging device 1 includes, for example, a body (housing) 10, an optical imaging system 20 including an imaging lens 22, a semi-transparent mirror 11, an imaging element 12A, an image plane phase difference AF sensor 12B, a dedicated phase difference AF sensor 13, an electronic view finder 14, and a display 15.

As illustrated in FIG. 1, the optical imaging system 20 is provided for the body 10. The optical imaging system 20 is a so-called interchangeable lens unit, for example, and the imaging lens 22, a diaphragm, and the like are provided in a lens barrel 21. The imaging lens 22 is driven by a focus drive system (not illustrated), and auto focus (AF) operation is enabled. The optical imaging system 20 according to the present embodiment is detachable from the body 10 with a predetermined adapter interposed therebetween. Furthermore, the optical imaging system 20 includes a microcomputer (not illustrated) and is enabled to communicate with the control unit on the body 10 side.

In the body 10, the semi-transparent mirror 11 is provided between the imaging lens 22 and the imaging element 12A in the body 10. Subject light is incident on the semi-transparent mirror 11 through the imaging lens 22. The semi-transparent mirror 11 reflects a part of the subject light incident through the imaging lens 22 in a direction to the dedicated phase difference AF sensor 13 above, and also transmits a part of the subject light to the imaging element 12A. Note that, the transmittance, reflectance, and the like of the semi-transparent mirror 11 can be arbitrarily set.

The imaging element 12A for generating a captured image is provided in the body 10. As the Imaging element 12A, a charge coupled device (CCD), complementary metal oxide semiconductor (CMOS), or the like is used. The imaging element 12A photoelectrically converts the subject light incident through the imaging lens 22 into an amount of charge, to generate an image. The image signal is subjected to predetermined signal processing such as white balance adjustment processing and gamma correction processing, and is finally stored, as image data, in a storage medium in the imaging device 1, a portable memory detachable from the imaging device 1, or the like.

The imaging element 12A includes normal imaging pixels, for example, a red (R) pixel, a green (G) pixel, and a blue (B) pixel, and also includes an image plane phase difference AF sensor 12B that performs phase difference focus detection. The image plane phase difference AF sensor 12B includes phase difference detection pixels arranged in a part of the imaging element 12A. Each pixel constituting the Imaging element photoelectrically converts incident light from a subject into an amount of charge, to output a pixel signal.

For example, the dedicated phase difference AF sensor 13 is provided, in the body 10, to be positioned above the semi-transparent mirror 11 and in front of the imaging element 12A. The dedicated phase difference AF sensor 13 is, for example, a phase difference detection type AF dedicated module. The subject light focused by the imaging lens 22 is reflected by the semi-transparent mirror 11 and is incident on the dedicated phase difference AF sensor 13. A focus detection signal detected by the dedicated phase difference AF sensor 13 is supplied to a processing unit that calculates an amount of defocus in the imaging device 1, and the like. As described above, the imaging device 1 according to the embodiment performs autofocus using the dedicated phase difference AF sensor 13 and the image plane phase difference AF sensor 12B.

In the present embodiment, the dedicated phase difference AF sensor 13 detects a horizontal line, and the image plane phase difference AF sensor 12B detects a vertical line. Moreover, in the image, a range covered by the dedicated phase difference AF sensor 13 and a range covered by the image plane phase difference AF sensor 12B may overlap each other, and in an overlapped range, cross distance measurement is performed that detects horizontal and vertical lines. However, an autofocus method performed by the imaging device 1 may be a method using only the image plane phase difference AF sensor 12B.

The body 10 is provided with the electronic view finder (EVF) 14. The electronic view finder 14 includes, for example, a liquid crystal display (LCD), an organic electroluminescence (EL) display, and the like. The electronic view finder 14 is supplied with image data obtained by processing an image signal taken out from the imaging element 12A by a signal processing unit (not illustrated). The electronic view finder 14 displays images corresponding to those image data as a real time image (through image).

The body 10 is provided with the display 15. The display 15 is a display such as a liquid crystal display or an organic EL. The display 15 is supplied with image data obtained by processing the image signal taken out from the imaging element 12A by the signal processing unit (not illustrated), and the display 15 displays those image data as a real time image (so-called through image). In FIG. 1, the display 15 is provided on the back side of the body 10; however, this is not a limitation, and the display 15 may be provided on the upper surface of the body 10 or may be a movable type or a removable type. The display 15 does not have to be provided in the body 10, and in this case, a television device or the like connected to the imaging device 1 may function as the display 15. Furthermore, on the display 15, an area (for example, a rectangular frame) in which autofocus according to a mode is performed is superimposed on the real time image and displayed.

[Internal Configuration Example of Imaging Device]

Figure 2:
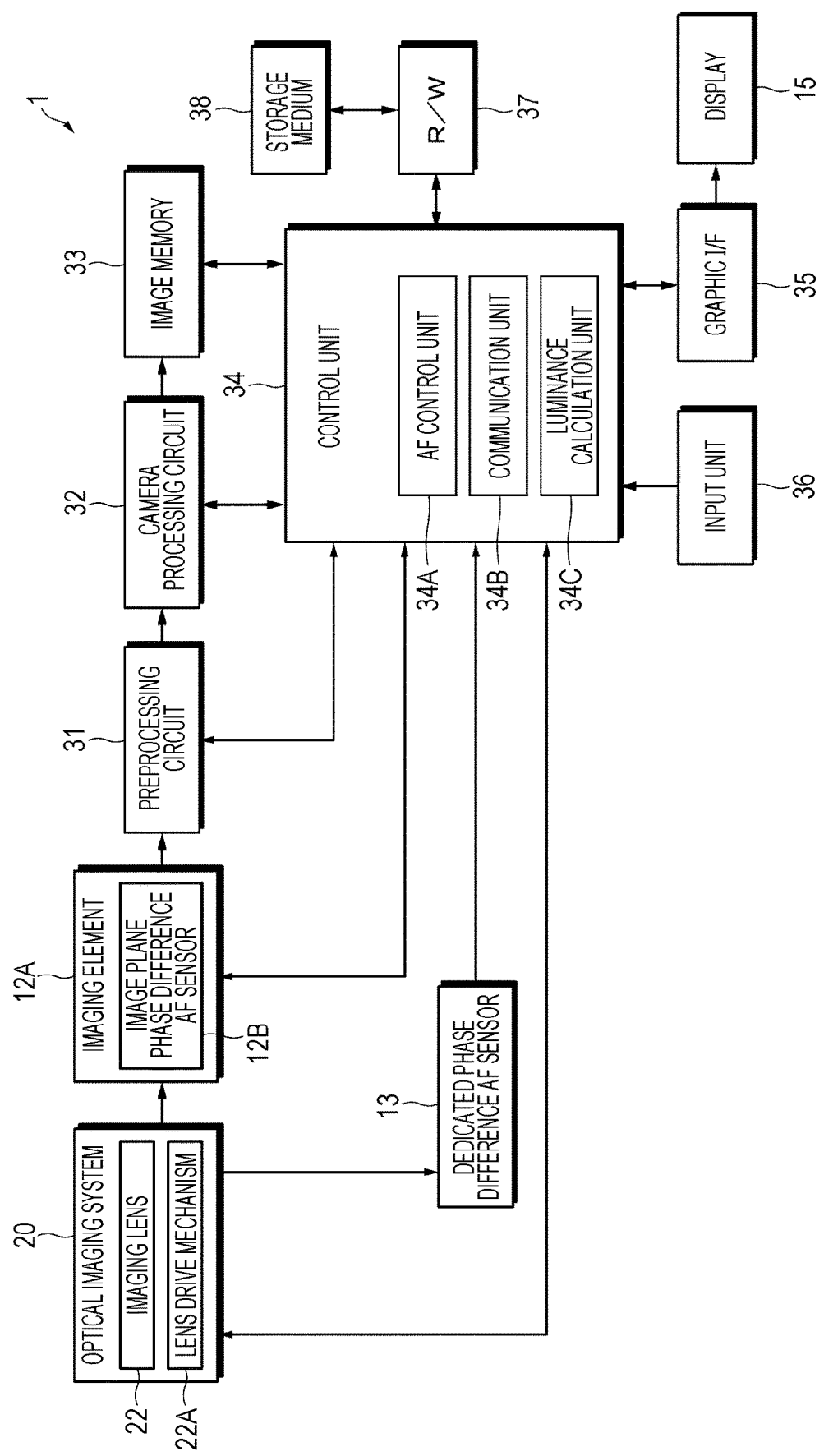
FIG. 2 is a block diagram illustrating a configuration example of the imaging device according to the embodiment of the present disclosure.

Next, with reference to the block diagram of FIG. 2, an internal configuration example will be described of the imaging device 1 (a configuration example mainly related to signal processing). In addition to the optical imaging system 20, the dedicated phase difference AF sensor 13, the imaging element 12A, the image plane phase difference AF sensor 12B, and the display 15 described above, the imaging device 1 includes, for example, a preprocessing circuit 31, a camera processing circuit 32, an image memory 33, a control unit 34, a graphic interface (I/F) 35, an input unit 36, a reader/writer (R/W) 37, and a storage medium 38.

The optical imaging system 20 includes the imaging lens 22 (including a focus lens, a zoom lens, and the like) for focusing light from a subject on the imaging element 12A, a lens drive mechanism 22A that performs focus adjustment by moving the focus lens, a shutter mechanism, and an iris mechanism. These are driven on the basis of a control signal from the control unit 34. The lens drive mechanism 22A implements AF operation by moving the imaging lens 22 along an optical axis direction in accordance with a control signal supplied from the control unit 34. An optical image of the subject obtained through the optical imaging system 20 is formed on the Imaging element 12A as an image capturing device.

The dedicated phase difference AF sensor 13 is, for example, a phase difference detection type AF dedicated sensor. The subject light focused by the imaging lens 22 is reflected by the semi-transparent mirror 11, thereby being incident on the dedicated phase difference AF sensor 13. The focus detection signal detected by the dedicated phase difference AF sensor 13 is supplied to the control unit 34.

As described above, the imaging element 12A includes the normal imaging pixels and the phase difference detection pixels. The image plane phase difference AF sensor 12B is an AF sensor including the plurality of phase difference detection pixels. A focus detection signal detected by the image plane phase difference AF sensor 12B is supplied to the control unit 34.

The preprocessing circuit 31 performs sample-hold and the like on an imaging signal output from the Imaging element 12A to maintain satisfactory signal/noise (S/N) ratio by correlated double sampling (CDS) processing. Moreover, gain is controlled by auto gain control (AGC) processing and analog/digital (A/D) conversion is performed to output a digital image signal.

The camera processing circuit 32 performs, on the image signal from the preprocessing circuit 31, signal processing such as white balance adjustment processing, color correction processing, gamma correction processing, Y/C conversion processing, and auto exposure (AE) processing.

The image memory 33 is a volatile memory, for example, a buffer memory including dynamic random access memory (DRAM), and temporarily stores image data subjected to predetermined processing by the preprocessing circuit 31 and the camera processing circuit 32.

The control unit 34 includes, for example, a central processing unit (CPU), random access memory (RAM), read only memory (ROM), and the like. The ROM stores a program read and executed by the CPU, and the like. The RAM is used as work memory of the CPU. The CPU executes various types of processing in accordance with the program stored in the ROM and issues commands to entirely control the imaging device 1.

Furthermore, the control unit 34 includes, for example, an AF control unit 34A, a communication unit 34B, and a luminance calculation unit 34C as functional blocks. The AF control unit 34A executes control for implementing autofocus on the basis of outputs of the image plane phase difference AF sensor 12B and the dedicated phase difference AF sensor 13. Although details will be described later, the AF control unit 34A acquires distance measurement information that is a distance to the subject on the basis of an addition value obtained by adding together outputs of the plurality of phase difference detection pixels supplied from the imaging element 12A in which the plurality of phase difference detection pixels different in phase difference characteristic is arranged. Then, in the present embodiment, the AF control unit 34A adds together the outputs of the phase difference detection pixels different in phase difference characteristic, acquires the distance measurement information that is the distance to the subject on the basis of the addition value, and executes autofocus on the basis of the distance information acquired. Note that, the processing of adding together the outputs of the phase difference detection pixels different in phase difference characteristic may be performed by another functional block.

The communication unit 34B communicates with the optical imaging system 20, for example. The communication unit 34B acquires information regarding an exit pupil distance of the imaging lens 22 by communicating with the optical imaging system 20. The exit pupil distance is determined by a zoom lens position, a focus lens position, an F value, and the like. In a case where the imaging lens 22 is an interchangeable lens, the exit pupil distance is calculated in the imaging lens 22. The microcomputer in the imaging lens 22 has exit pupil distance information as a table that is calculated in advance by a simulator or the like and has parameters such as the zoom position, the focus lens position, the F value, and the like, and the microcomputer calculates the exit pupil distance with reference to the table. Note that, the exit pupil distance may be calculated by the control unit 34.

The luminance calculation unit 34C calculates a luminance by using an image (for example, a live view (LV) image) subjected to processing by the camera processing circuit 32. A known method can be applied as a method for calculating the luminance.

The graphic I/F 35 generates an image signal to be displayed on the display 15 from an image signal supplied from the control unit 34, and supplies the generated signal to the display 15 to display an image. The display 15 displays a through image being captured, an image recorded in the storage medium 38, and the like.

The input unit 36 includes, for example, a power button for switching power on/off, a release button for giving an instruction to start recording a captured image, an operation element for zoom adjustment, a touch screen integrally formed with the display 15, and the like. When an input is made to the input unit 36, a control signal corresponding to the input is generated and output to the control unit 34. Then, the control unit 34 performs calculation processing and control corresponding to the control signal.

The R/W 37 is an interface to which the storage medium 38 that records image data generated by imaging is connected. The R/W 37 writes data supplied from the control unit 34 to the storage medium 38, and outputs data read from the storage medium 38 to the control unit 34. The storage medium 38 is a mass storage medium, for example, a hard disk, a memory stick (registered trademark of Sony Corporation), an SD memory card, or the like. The image is stored in a compressed state on the basis of a standard, for example, JPEG or the like. Furthermore, exchangeable image file format (EXIF) data including additional information such as information regarding the image stored and imaging date and time, is also stored in association with the image.

[Basic Operation Example of Imaging Device]

Here, basic operation will be described in the imaging device 1 described above. Before an image is captured, signals obtained by photoelectric conversion of light received by the imaging element 12A are sequentially supplied to the preprocessing circuit 31. In the preprocessing circuit 31, an input signal is subjected to CDS processing, AGC processing, and the like, and further converted into an image signal.

The camera processing circuit 32 performs image quality correction processing on the image signal supplied from the preprocessing circuit 31, and supplies the image signal, as a through image signal, to the graphic I/F 35 via the control unit 34. As a result, the through image is displayed on the display 15. A user can adjust the angle of view by viewing the through image displayed on the display 15.

In this state, when a shutter button of the input unit 36 is pressed, the control unit 34 outputs a control signal to the optical imaging system 20 to operate a shutter constituting the optical imaging system 20. As a result, an image signal for one frame is output from the imaging element 12A.

The camera processing circuit 32 performs image quality correction processing on the image signal for one frame supplied from the imaging element 12A via the preprocessing circuit 31, and supplies the processed image signal to the control unit 34. The control unit 34 compresses and encodes the input image signal and supplies the generated coded data to the R/W 37. As a result, a data file of a captured still image is stored in the storage medium 38 via the R/W 37. Note that, in capturing of a video image, the above-described processing is performed in real time in response to a video image capturing instruction. It is also possible to capture a still image during video image capturing by pressing the shutter button during the video image capturing.

On the other hand, in a case where an image file stored in the storage medium 38 is reproduced, the control unit 34 reads a selected still image file from the storage medium 38 via the R/W 37 in response to an operation input from the input unit 36. Decompression and decoding processing is performed on the read image file. Then, the decoded image signal is supplied to the graphic I/F 35 via the control unit 34. As a result, the still image stored in the storage medium 38 is displayed on the display 15. [About Autofocus by General Image Plane Phase Difference Method]

Next, to facilitate understanding of the present disclosure, autofocus by a general image plane phase difference method will be described.

In the image plane phase difference method, a phase difference detection pixel is arranged in a predetermined line of the imaging element together with, for example, a green (G) pixel. For example, a pair of phase difference detection pixel A and phase difference detection pixel B constitute a phase difference detection pixel pair. A plurality of phase difference detection pixel pairs is arranged in the predetermined line of the imaging element.

Pupil division of light having passed through the imaging lens is performed by the phase difference detection pixel pairs, and outputs of a plurality of the phase difference detection pixels A and outputs of a plurality of the phase difference detection pixels B are each integrated, and a pair of images (for example, output waveforms) are generated. A degree of focusing can be detected by measuring (detecting a phase difference) a difference between the pair of images (amount of shift between the images). In processing of detecting the degree of focusing, processing may be executed, for example, correction processing in consideration of optical conditions such as the F value of the imaging lens, amplification processing that amplifies the output waveform, and the like.

Figure 3:
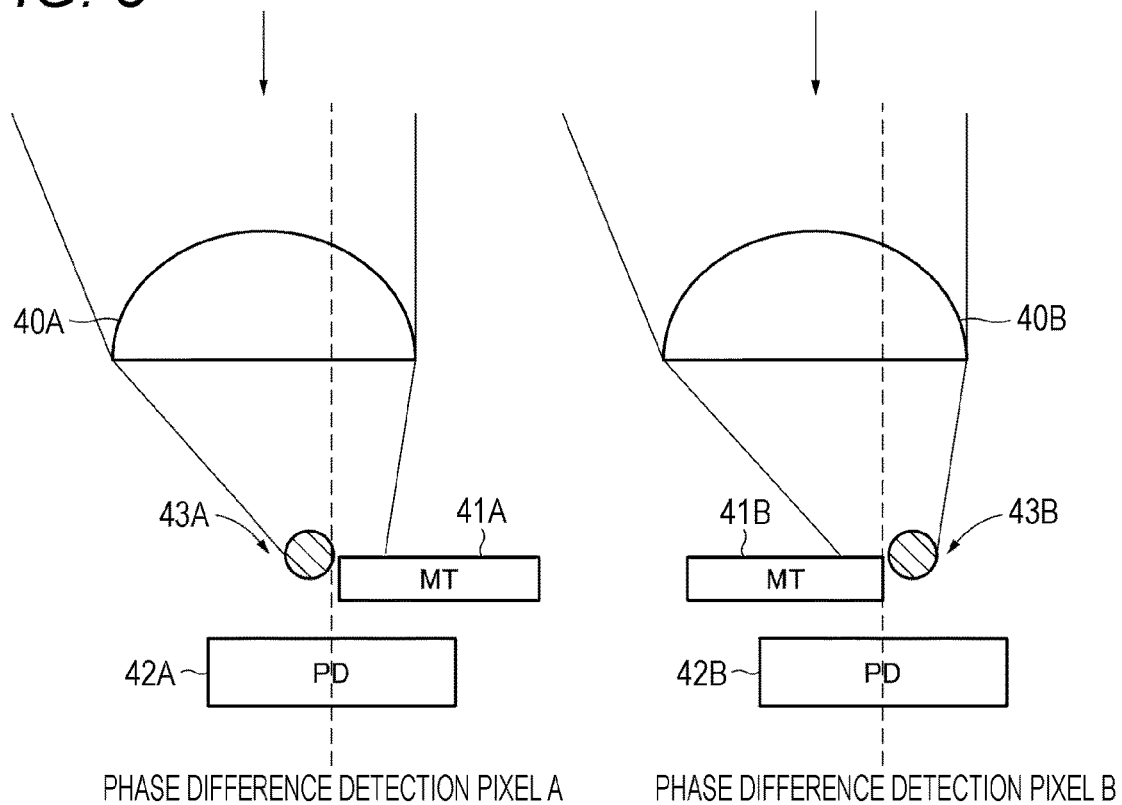
FIG. 3 is a diagram for explaining a configuration example of a pair of phase difference detection pixels.

FIG. 3 illustrates an example of the phase difference detection pixel A and the phase difference detection pixel B. The phase difference detection pixel A has a configuration in which an on-chip lens 40A, a light shielding mask (MT) 41A, and a photodiode (PD) 42A are sequentially formed in an incident direction (direction indicated by an arrow in FIG. 3) of light incident through the imaging lens 22. A part of the photodiode 42A is shielded from light by the light shielding mask 41A, and an opening 43A is formed as a portion not shielded by the light shielding mask 41A. The light is incident on the photodiode 42A from the opening 43A.

The phase difference detection pixel B has a configuration in which an on-chip lens 40B, a light shielding mask (MT) 41B, and a photodiode (PD) 42B are sequentially formed in the incident direction of the light incident through the imaging lens 22. A part of the photodiode 42B is shielded from light by the light shielding mask 41B, and an opening 43B is formed as a portion not shielded by the light shielding mask 41B.

The light is incident on the photodiode 42B from the opening 43B. Note that, in FIG. 3, amounts of light received by the respective photodiodes 42A and 42B are schematically illustrated by circles with hatching. Furthermore, in FIG. 3, illustration of a color filter and the like is omitted as appropriate. The color filter is arranged, for example, between the on-chip lens and the light shielding mask.

Normally, in assumption of a certain exit pupil distance (EPD), the phase difference detection pixel has a phase difference characteristic optimized for the exit pupil distance. In general, the phase difference detection pixel has a phase difference characteristic optimized, for example, for the exit pupil distance of a versatile imaging lens. Here, the phase difference characteristic is a characteristic based on a difference in the corresponding exit pupil distances, and specifically means a difference in the opening positions of the phase difference detection pixels that varies depending on the difference in the exit pupil distances (may be a difference in positions of the light shielding masks).

In a case where the exit pupil distance of the imaging lens is as assumed, or in a case where the phase difference characteristic of the phase difference detection pixel is equal to the exit pupil distance of the imaging lens, the amounts of light received by the respective photodiodes 42A and 42B are substantially equal to each other like that the circles in FIG. 3 have approximately the same size. In this case, since the magnitudes of the output waveforms of the phase difference detection pixel A and the phase difference detection pixel B are substantially equal to each other, the accuracy of autofocus can be secured.

Figure 4:
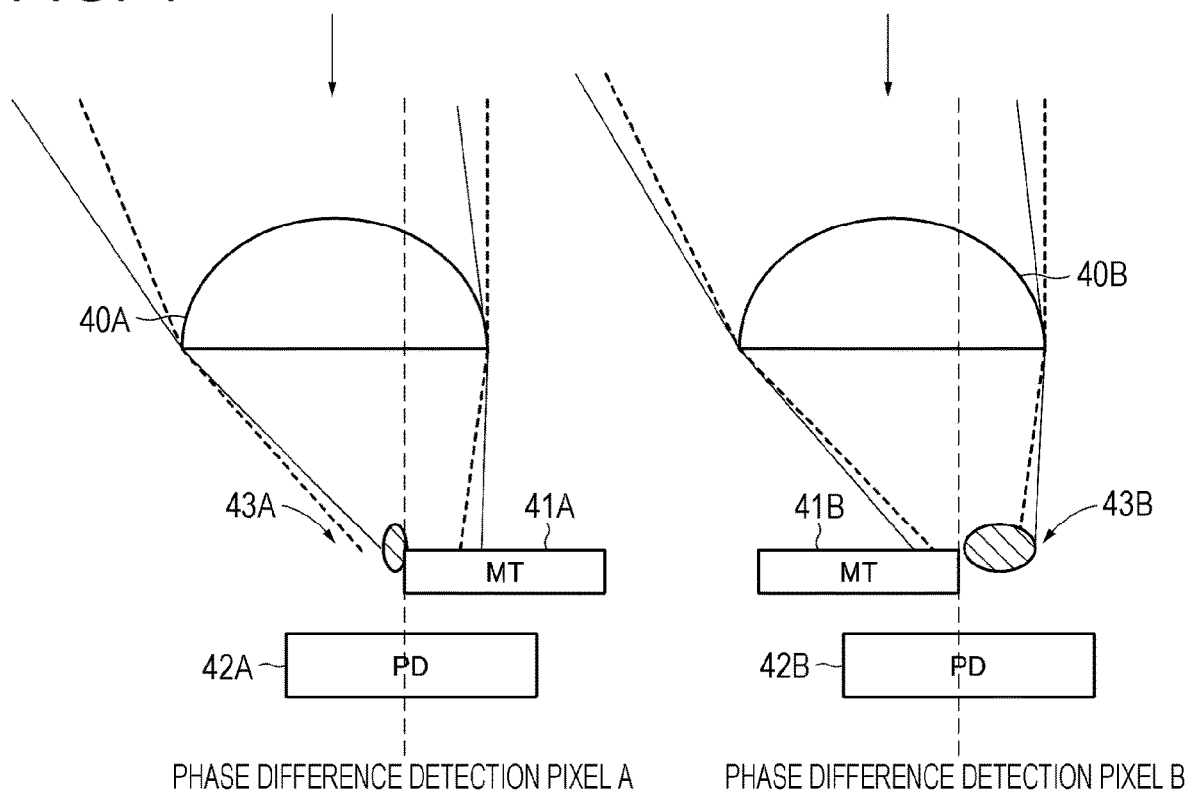
FIG. 4 is a diagram for explaining an example in which amounts of light received are uneven for the pair of phase difference detection pixels.

However, in a case where the imaging lens is interchangeable, the exit pupil distance may be different for each imaging lens. In a case where the exit pupil distance and the phase difference characteristic of the phase difference detection pixel do not match each other, the amounts of light received by the respective photodiodes 42A and 42B are uneven as illustrated schematically in FIG. 4. If the amounts of light received are uneven, the magnitude of the output waveform of the phase difference detection pixel A and the magnitude of the output waveform of the phase difference detection pixel B are uneven, and an error becomes large in calculation of a distance at which both waveforms match each other, so that the accuracy of autofocus is reduced.

Figure 5:
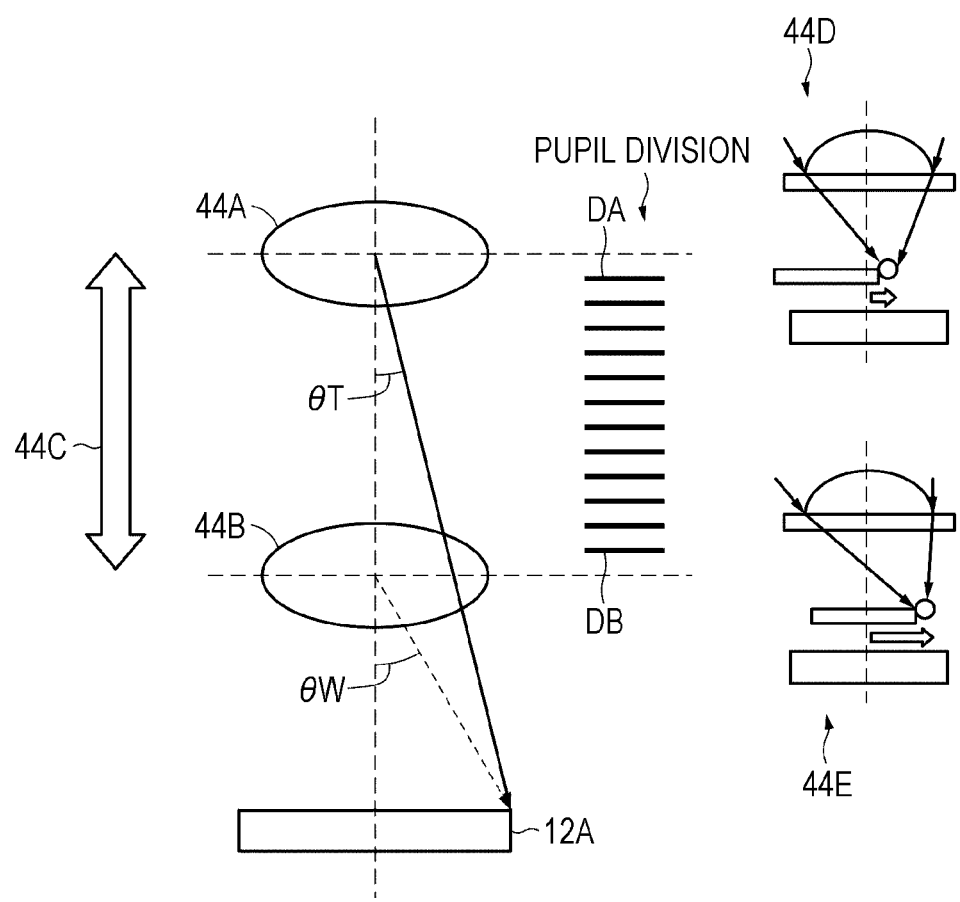
FIG. 5 is a diagram for explaining an example of pupil division.

Thus, in the present embodiment, a plurality of exit pupil distances is set, and phase difference detection pixels having phase difference characteristics in which the corresponding exit pupil distances are limited are arranged on the imaging element. This point will be described with reference to FIG. 5. FIG. 5 is a diagram schematically illustrating the exit pupil distance for the imaging element 12A, and an ellipse with a reference sign 44A indicates a case where the pupil is far, and an ellipse with the reference sign 44B indicates a case where the pupil is close. An arrow with a reference sign 44C indicates a range in which the incident angle changes, and in the illustrated example, the incident angle changes from θT to θW.

A plurality of black horizontal lines in FIG. 5 indicates an example of pupil division. Note that, in the present embodiment, the term pupil division is used in the meaning of setting the plurality of exit pupil distances. In the illustrated example, an example is illustrated of 12 exit pupil distances based on 12-division pupil division. Then, it is illustrated that the phase difference characteristics of the phase difference detection pixels differ corresponding to respective exit pupil distances. For example, a phase difference detection pixel (that may be either the phase difference detection pixel A or the phase difference detection pixel B) having a phase difference characteristic optimized for a certain exit pupil distance DA is illustrated as a phase difference detection pixel 44D. Furthermore, a phase difference detection pixel (that may be either the phase difference detection pixel A or the phase difference detection pixel B) having a phase difference characteristic optimized for an exit pupil distance DB different from the exit pupil distance DA is illustrated as a phase difference detection pixel 44E. In each of the phase difference detection pixels 44D and 44E, an opening position is set so that an amount of light received to secure the accuracy of autofocus can be obtained in a case where an imaging lens having a corresponding exit pupil distance is used.

In a case where an imaging lens whose exit pupil distance is the exit pupil distance DA is used, the phase difference detection pixel 44D and a phase difference detection pixel paired therewith are used. In a case where an imaging lens whose exit pupil distance is the exit pupil distance DB is used, the phase difference detection pixel 44E and a phase difference detection pixel paired therewith are used. As a result, even in cases where imaging lenses having different exit pupil distances are used, the amount of light received by the phase difference detection pixels can be secured, so that the accuracy of autofocus can be prevented from being degraded.

On the other hand, to prevent degradation in image quality, the phase difference detection pixels are coarsely arranged in the imaging element as compared to normal pixels (pixels that are not phase difference detection pixels). Moreover, as illustrated in FIG. 5, in a case where 12 patterns of phase difference detection pixels are arranged corresponding to 12 exit pupil distances, high-precision autofocus is possible, but only 1/12 of the phase difference detection pixels are used of all phase difference detection pixels. For this reason, in an imaging condition, for example, in a low illuminance environment where the luminance is less than or equal to a threshold value, degradation of the S/N of the phase difference detection pixel is significant, and there is a possibility that the accuracy of autofocus is degraded. The embodiment of the present disclosure made in view of the above points will be described in more detail.

[Arrangement Example of Phase Difference Detection Pixels]

Figure 6:
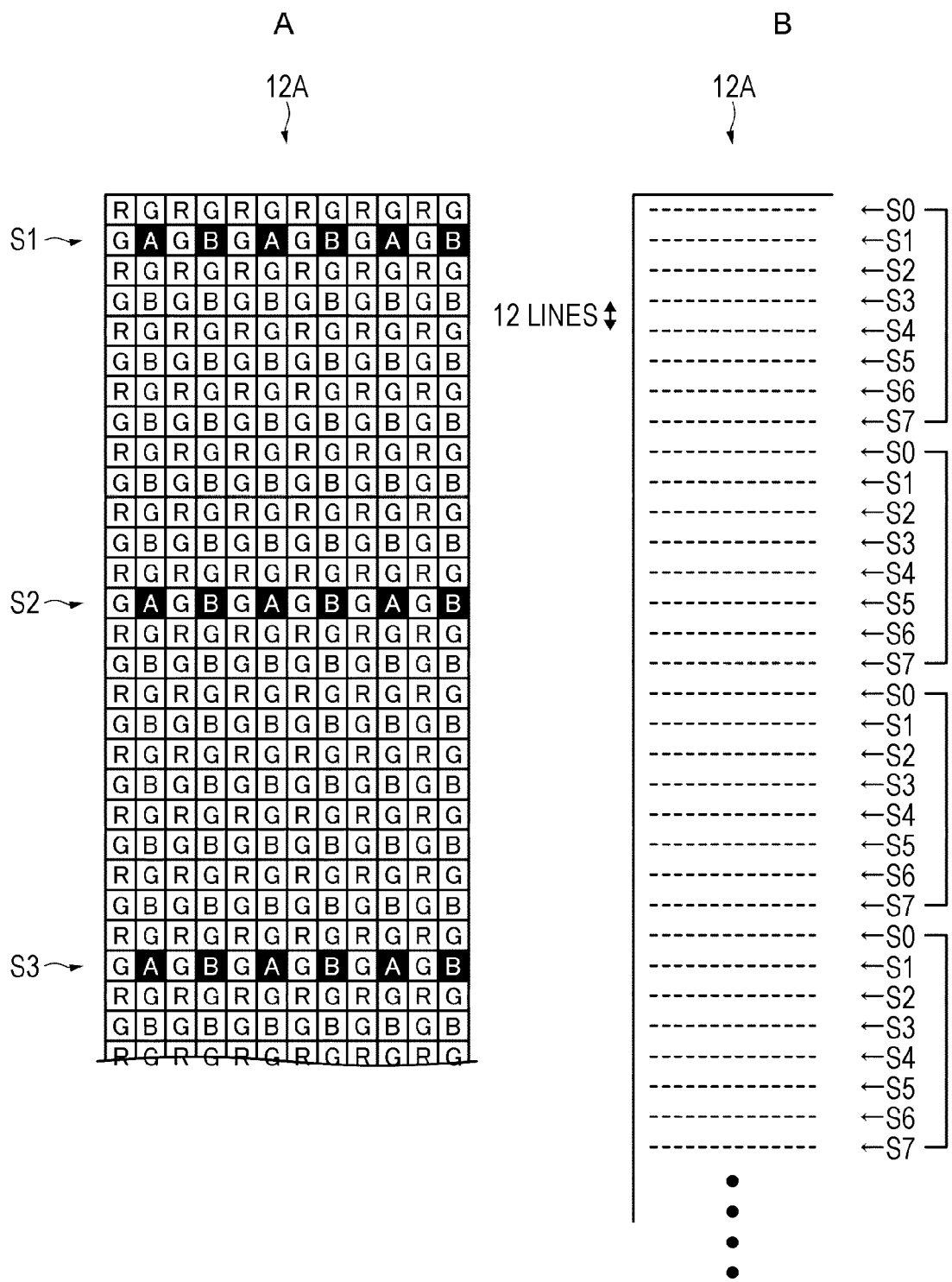
FIGS. 6A and 6B are diagrams for explaining an arrangement example of phase difference detection pixels according to the embodiment of the present disclosure.

FIGS. 6A and 6B are diagrams illustrating an arrangement example of the phase difference detection pixels in the imaging element 12A. FIG. 6A is a diagram illustrating in detail the arrangement example of the phase difference detection pixels, and FIG. 6B is a diagram illustrating the arrangement example of the phase difference detection pixels over a wide range by simplifying the arrangement example of the phase difference detection pixels. Note that, FIGS. 6A and 6B are diagrams each illustrating a part of the imaging element 12A.

The imaging element 12A has a configuration in which a plurality of pixels is arranged in the horizontal direction and the vertical direction. Each pixel constituting the imaging element 12A has a color filter. As illustrated in FIG. 6A, the color filter is of a so-called Bayer array in which three primary color filters of green (G), blue (B), and red (R) are arrayed. Note that, the color filter in the present disclosure is not limited to the Bayer array primary color filter, and may be a complementary color filter in which green (G), yellow (Ye), magenta (Mg), and cyan (Cy) are arrayed. Furthermore, a part of the Bayer array may be white (W), and the configuration of the color filter may be omitted.

As illustrated in FIG. 6A, the phase difference detection pixels are arranged together with the G pixels in a predetermined line of the imaging element 12A. More specifically, the phase difference detection pixels A and phase difference detection pixels B paired with each other are alternately arranged in the predetermined line of the imaging element 12A, and in the line, a plurality of phase difference detection pixel pairs is arranged each including the phase difference detection pixel A and the phase difference detection pixel B.

With a predetermined number of lines, for example, 12 lines as a cycle, a line is set in which the phase difference detection pixels are arranged. In the present embodiment, a line S0 in which the phase difference detection pixels are arranged is set in 12 consecutive lines, and a line S1 in which the phase difference detection pixels are arranged is set in the next 12 consecutive lines, and moreover a line S2 in which the phase difference detection pixels are arranged is set in the next 12 consecutive lines. Similarly, a line S3 to a line S7 are set. Thus, FIGS. 6A and 6B illustrate an example in which phase difference detection pixels having eight patterns of phase difference characteristics corresponding to eight exit pupil distances are arranged in lines S0 to S7, respectively. More specifically, a phase difference detection pixel having a phase difference characteristic corresponding to an exit pupil distance D0 is arranged in the line S0, and a phase difference detection pixel having a phase difference characteristic corresponding to an exit pupil distance D1 is arranged in the line S1. Similarly, phase difference detection pixels having phase difference characteristics corresponding to exit pupil distances D2 to D7 are arranged in the lines S2 to S7, respectively. Note that, in the present embodiment, lines having close exit pupil distances are adjacent to each other. For example, the exit pupil distances D0 to D7 are set in ascending order (for example, D0 is the largest and D7 is the smallest), and the lines S0 to S7 corresponding to the respective exit pupil distances are each arranged in 12 lines.

[About Phase Difference Detection Pixels]

Next, the phase difference detection pixels will be described in detail with reference to FIG. 7. FIG. 7 illustrates opening patterns of the phase difference detection pixels. The phase difference detection pixel has the configuration described with reference to FIG. 3, for example, and the phase difference detection pixel according to the present embodiment detects a vertical line. For example, the phase difference detection pixel A is a left opening pixel having the opening 43A on the left side as illustrated in FIG. 7A. In this case, the phase difference detection pixel B is a right opening pixel having the opening 43B on the right side.

Furthermore, the phase difference detection pixel A may be a right opening pixel having the opening 43A on the right side as illustrated in FIG. 7B.

Note that, the phase difference detection pixel may detect a horizontal line. The phase difference detection pixel A may be a left opening pixel having the opening 43A on the upper side as illustrated in FIG. 7C, or may be a lower opening pixel having the opening 43A on the lower side as illustrated in FIG. 7D (note that, the opening position of the phase difference detection pixel B paired with the phase difference detection pixel A is opposite to the opening position of the phase difference detection pixel A). Moreover, as illustrated in FIG. 7E, the phase difference detection pixel may have a configuration including two photodiodes (photodiodes 45A and 45B) for one on-chip lens 45, for example. In other words, one phase difference detection pixel may have a configuration including the phase difference detection pixel A and the phase difference detection pixel B. The photodiodes 45A and 45B may be arranged on the left and right, or may be arranged on the top and bottom.

[Operation Example of Imaging Device]

Next, an operation example will be described of the imaging device 1. Briefly describing the operation example of the imaging device 1, the imaging device 1 performs switching between executing autofocus by using outputs of the phase difference detection pixels arranged in a predetermined line and executing autofocus by using outputs of the phase difference detection pixels arranged in each of a plurality of lines, depending on whether or not the imaging condition satisfies a predetermined condition. Here, the imaging condition is a concept including settings of the imaging device 1 (settings of sensitivity, shutter speed, aperture, and the like) and the luminance, and in the present embodiment, the luminance is used as an example of the imaging condition. As the luminance, for example, an exposure value (EV) value can be used. In the present embodiment, the luminance is determined on the basis of a luminance of the image signal obtained through the optical imaging system 20, but may be determined by using a photometric sensor or the like. Furthermore, the predetermined condition according to the present embodiment is whether or not the luminance is smaller than a threshold value. Note that, the value smaller than the threshold value may be less than or equal to the threshold value or may be less than the threshold value. Furthermore, the value larger than the threshold value may be greater than or equal to the threshold value or greater than the threshold value.

Figure 8:
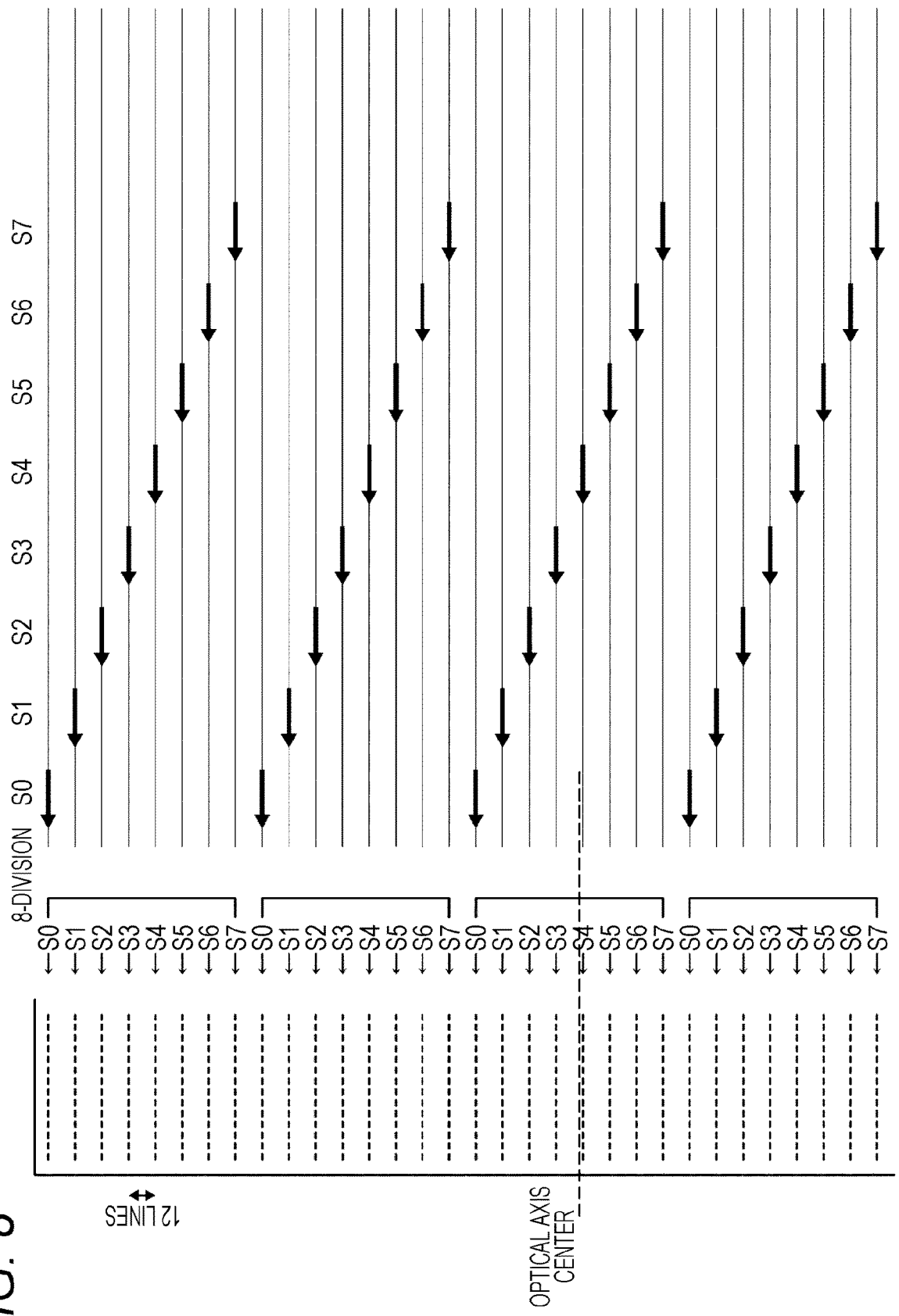
FIG. 8 is a diagram for explaining processing performed in the imaging device according to the embodiment of the present disclosure.

A specific operation example will be described with reference to FIG. 8. The luminance calculation unit 34C of the control unit 34 calculates a luminance on the basis of an image obtained through the optical imaging system 20. This luminance is based on, for example, a luminance in an image obtained by exposure of the normal pixel in a frame before exposure of the phase difference detection pixel. Furthermore, the communication unit 34B of the control unit 34 communicates with the imaging lens 22 of the optical imaging system 20, and acquires an exit pupil distance corresponding to the imaging lens 22. For example, in a case where the luminance does not satisfy the condition, in other words, in a case where the luminance is larger than the threshold value, the AF control unit 34A executes autofocus by using outputs of the phase difference detection pixels having a phase difference characteristic corresponding to the exit pupil distance of the imaging lens 22.

For example, in a case where the exit pupil distance of the imaging lens 22 acquired by the communication unit 34B is D0, the AF control unit 34A executes autofocus by using outputs of the phase difference detection pixels arranged in a line in which phase difference detection pixels having a phase difference characteristic corresponding to the exit pupil distance D0, in other words, the line S0. Specifically, the AF control unit 34A integrates each of outputs of a plurality of phase difference detection pixels A and outputs of a plurality of phase difference detection pixels B arranged in the line S0, to generate a pair of images (for example, output waveforms). Then, the AF control unit 34A detects an amount of defocus (DF amount) by measuring (detecting a phase difference) a difference between the pair of images (amount of shift between the images). Depending on the detection result, the AF control unit 34A outputs a control signal for moving the lens. On the basis of the control signal, the lens drive mechanism 22A operates, and the lens moves in a predetermined direction, whereby autofocus is executed.

Furthermore, in a case where the exit pupil distance of the imaging lens 22 acquired by the communication unit 34B is D1, the AF control unit 34A executes autofocus by using outputs of the phase difference detection pixels arranged in a line in which phase difference detection pixels having a phase difference characteristic corresponding to the exit pupil distance D1, in other words, the line S1. In other words, as indicated by arrows in FIG. 8, in a case where the luminance is not smaller than the threshold value, the AF control unit 34A executes autofocus by using outputs of only the phase difference detection pixels having the phase difference characteristic corresponding to the exit pupil distance of the imaging lens 22. Note that, in the following description, a line (first line) in which the phase difference detection pixels having the phase difference characteristic corresponding to the exit pupil distance of the imaging lens 22 is arranged may be referred to as a designated pupil line.

Next, with reference to FIG. 9, an operation example will be described of the imaging device 1 in a case where the luminance satisfies the condition, in other words, the luminance is smaller than the threshold value.

The communication unit 34B of the control unit 34 communicates with the imaging lens 22 of the optical imaging system 20, and acquires the exit pupil distance corresponding to the imaging lens 22. In a case where the luminance is smaller than the threshold value, the AF control unit 34A executes autofocus by using outputs of the phase difference detection pixels arranged in the designated pupil line and outputs of the phase difference detection pixels arranged in a line adjacent to the designated pupil line. Note that, the adjacent line means a line adjacent to a predetermined line (for example, the designated pupil line) among lines in which the phase difference detection pixels are arranged, and it is meant that lines are adjacent to each other excluding lines (lines of only normal pixels) positioned next to the predetermined line (for example, the designated pupil line).

A specific example will be described. For example, the exit pupil distance of the imaging lens 22 acquired by the communication unit 34B is D1. The AF control unit 34A sets the line in which the phase difference detection pixels having the phase difference characteristic corresponding to the exit pupil distance D1 are arranged, in other words, the line S1 as the designated pupil line. Then, the lines S0 and S2 are determined that are lines (second lines) adjacent to the line S1 that is the designated pupil line. The AF control unit 34A adds together outputs of the designated pupil line S1, the line S0, and the line S2. Specifically, as illustrated on the left side of FIG. 9, the AF control unit 34A adds together outputs of the phase difference detection pixels A arranged in each of the designated pupil line S1, the line S0, and the line S2, and divides the addition result by three that is the number of patterns (the number of lines) different in phase difference characteristic (averaging). Furthermore, the AF control unit 34A adds together outputs of the phase difference detection pixels B arranged in each of the designated pupil line S1, the line S0, and the line S2, and divides the addition value that is the addition result by three that is the number of phase difference characteristics (the number of lines) (averaging). The amount of defocus (DF amount) is detected by measuring (detecting the phase difference) a difference between a pair of images (amount of shift between the images) based on the respective calculation results. Depending on the detection result, the AF control unit 34A outputs a control signal for moving the lens. On the basis of the control signal, the lens drive mechanism 22A operates, and the lens moves in a predetermined direction, whereby autofocus is executed.

In a case where the exit pupil distance of the imaging lens 22 acquired by the communication unit 34B is D2, the line S2 is set as the designated pupil line. Then, the lines S1 and S3 are determined that are lines adjacent to the line S2 that is the designated pupil line. Thereafter, the AF control unit 34A executes autofocus as described above. Also in a case where another line is set as the designated pupil line, autofocus is executed similarly.

Note that, a case where the imaging lens 22 having an extreme exit pupil distance (for example, D0, D7) is used is practically rare but exists. Thus, there may be a case where the line S0 or the line S7 is set as the designated pupil line. For example, in a case where the line S0 is set as the designated pupil line, as illustrated in FIG. 9, the line S1 adjacent to the line S0 and the line S2 adjacent to the line S1 are set as lines used for autofocus. Outputs of the phase difference detection pixels A and the phase difference detection pixels B arranged in each of the designated pupil line S0, the line S1, and the line S2 are each added together and averaged, and autofocus is executed according to the calculation result. In a case where the line S7 is set as the designated pupil line, outputs of the phase difference detection pixels A and the phase difference detection pixels B arranged in each of the designated pupil line S7, the line S6, and the line S5 are each added together and averaged, and autofocus is executed according to the calculation result. As described above, the line adjacent to the designated pupil line may be one line or may be two lines.

Figure 9:
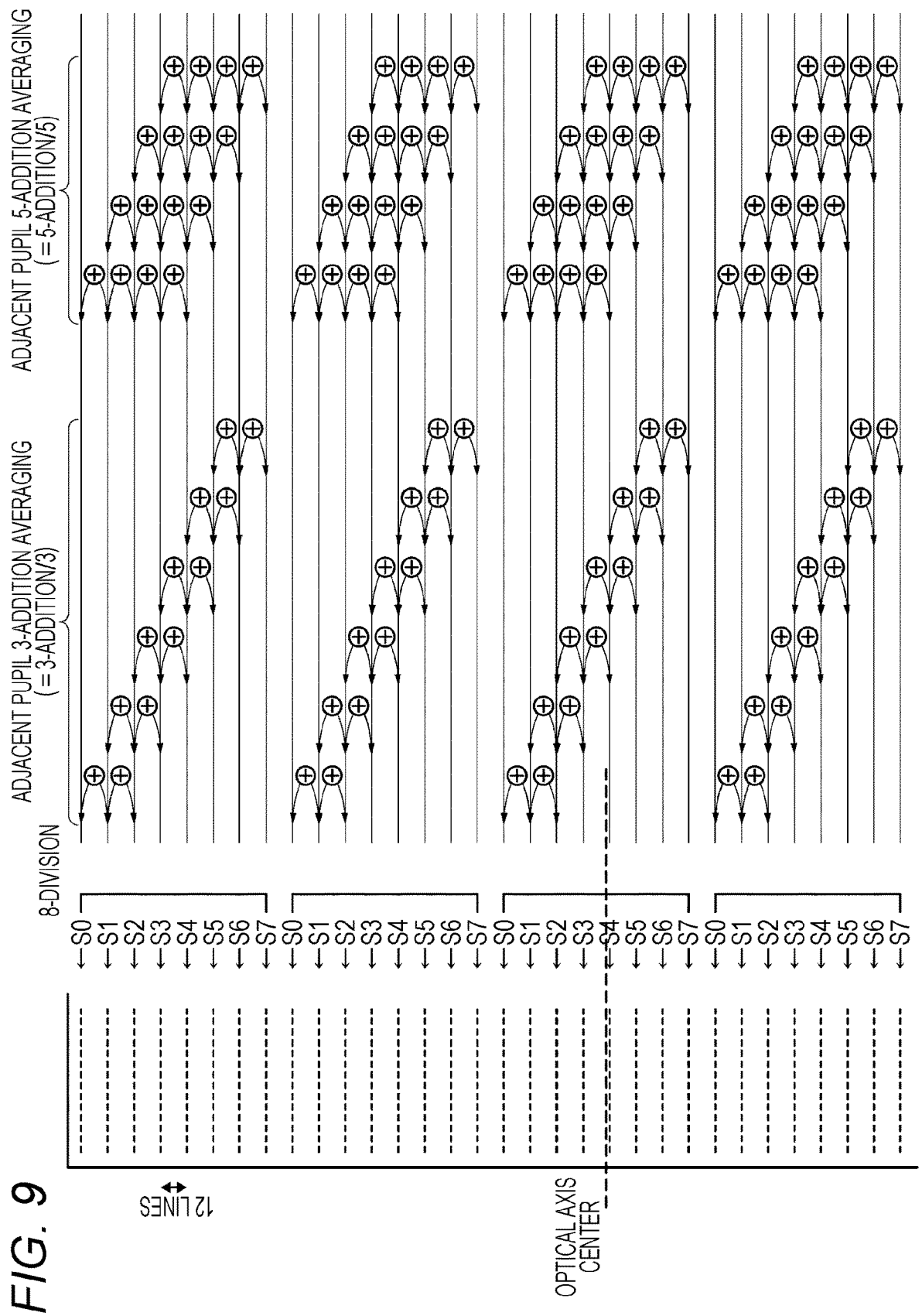
FIG. 9 is a diagram for explaining processing performed in the imaging device according to the embodiment of the present disclosure.

The above-described example is an example of 3-addition averaging in which outputs of the phase difference detection pixels arranged in each of three lines are added together and averaged, but 5-addition averaging may be used as illustrated on the right side of FIG. 9. For example, in a case where the line S3 is set as the designated pupil line, the line S2 and the line S4 that are adjacent to the designated pupil line S3, and the line S1 and the line S5 that are lines (third lines) respectively adjacent to the lines S2 and S4 are set as lines used for autofocus. Outputs of the phase difference detection pixels A and the phase difference detection pixels B arranged in each of the designated pupil line S3, the line S2, the line S4, the line S1, and the line S5 are each added together and averaged, and autofocus is executed according to the calculation results.

As described above, in the present embodiment, for example, in a case where the luminance is less than or equal to the threshold value, in other words, under low illuminance, autofocus is executed by using outputs of the phase difference detection pixels arranged in the plurality of lines. Thus, it is possible to avoid insufficient output of the phase difference detection pixels due to low illuminance, and it is possible to suppress degradation of the accuracy of autofocus.

[Flow of Processing]

Figure 10:
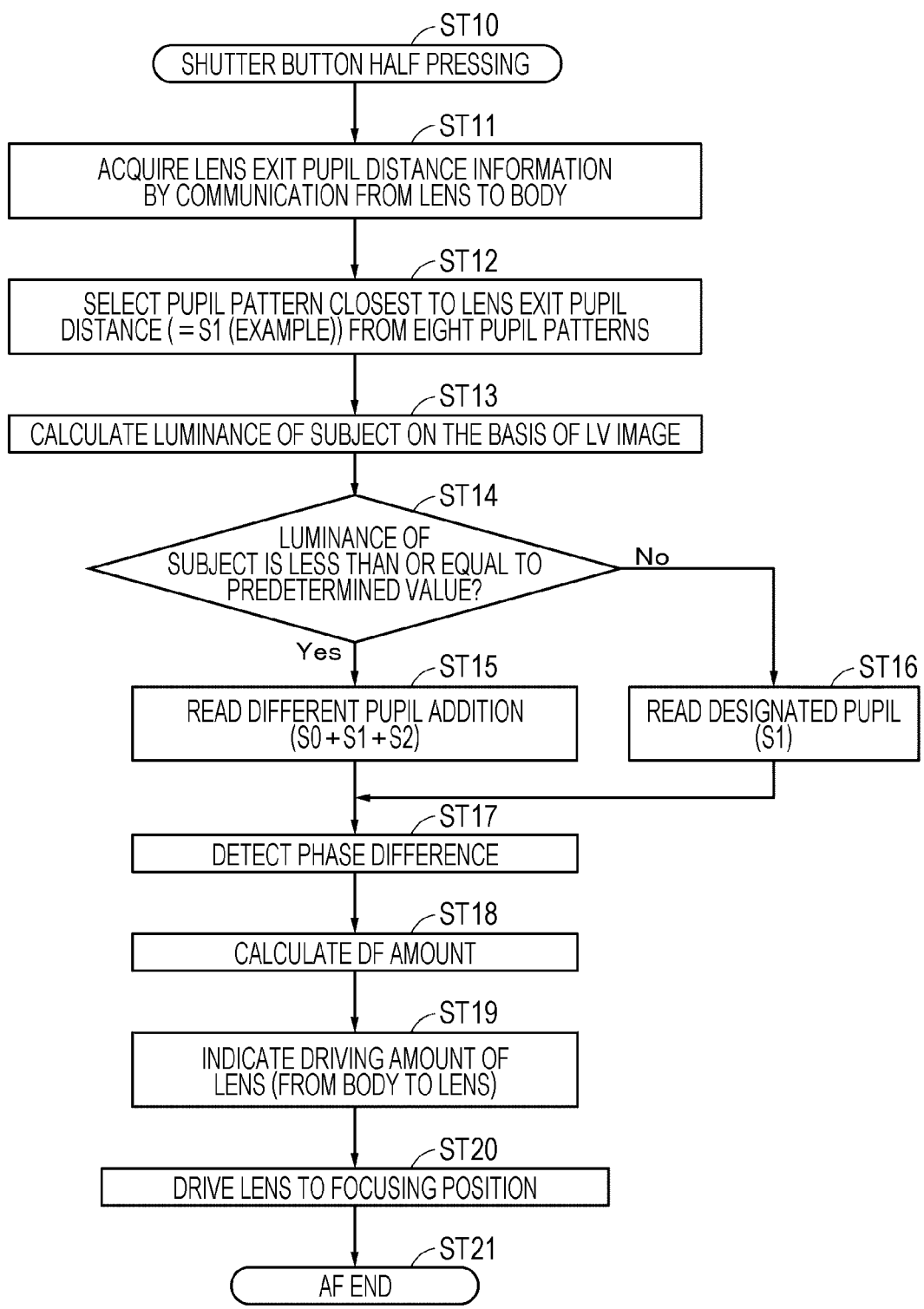
FIG. 10 is a flowchart illustrating a flow of processing performed in the imaging device according to the embodiment of the present disclosure.

An example will be described of the flow of processing executed by the imaging device 1, with reference to the flowchart of FIG. 10 and FIG. 11.

In step ST10, a shutter button that is a component of the input unit 36 is pressed about half (half pressing). In the present embodiment, autofocus is performed when the shutter button is half-pressed, but autofocus may be performed at other timings. Then, the processing proceeds to step ST11.

In step ST11, exit pupil distance information indicating the exit pupil distance of the imaging lens 22 is supplied from the imaging lens 22 to the body 10. Specifically, the communication unit 34B of the control unit 34 communicates with the optical imaging system 20, whereby the communication unit 34B acquires the exit pupil distance information of the imaging lens 22. Then, the processing proceeds to step ST12.

Figure 11:
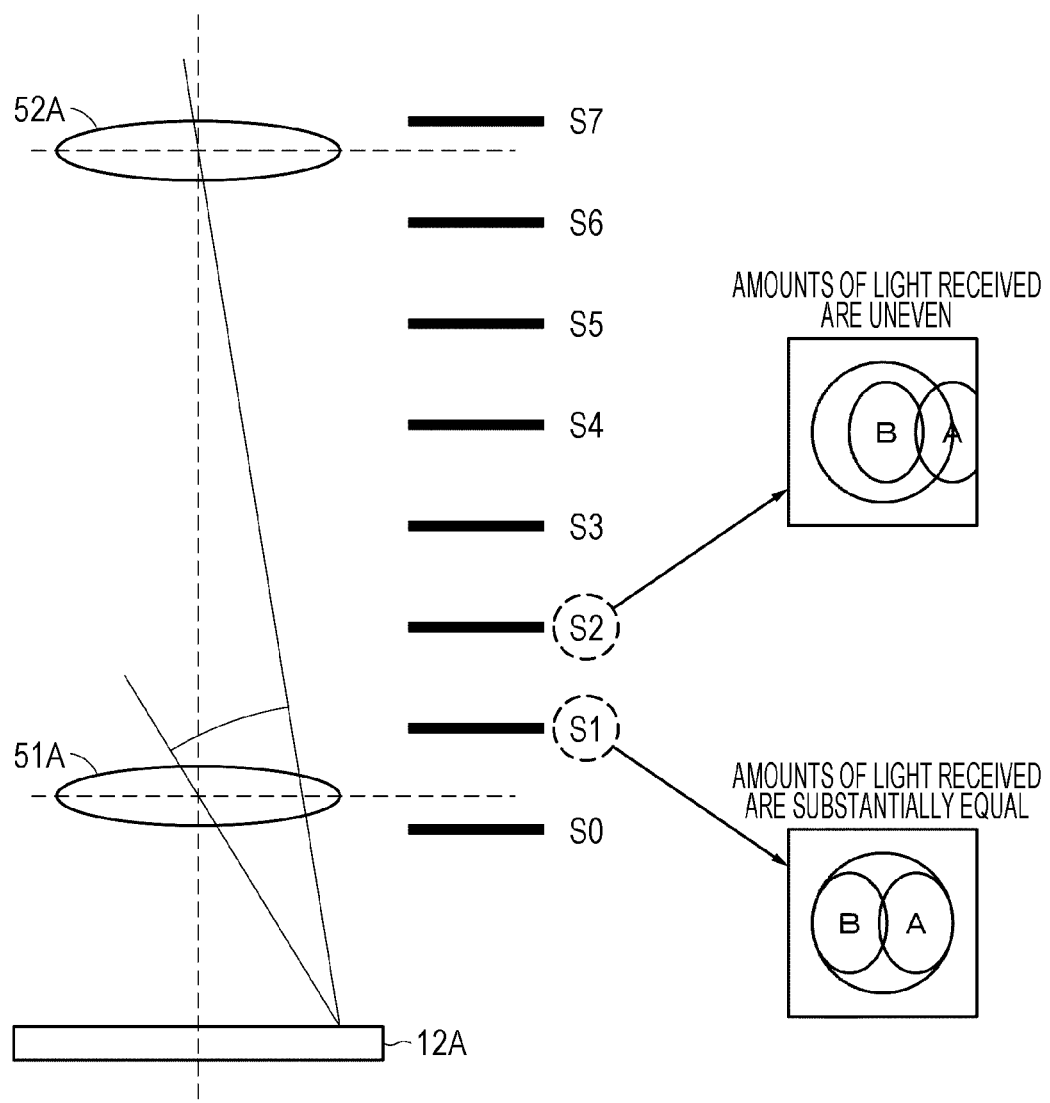
FIG. 11 is a diagram for reference in explaining the processing performed in the imaging device according to the embodiment of the present disclosure.

In this example, as illustrated in FIG. 11, an exit pupil distance between a lens (short pupil lens) 51A having a short exit pupil distance and a lens (long pupil lens) 52A having a long exit pupil distance is divided into eight, and eight exit pupil distances (pupil patterns) are set. In the lines S0 to S7, phase difference detection pixels having phase difference characteristics corresponding to the respective pupil patterns are arranged. In step ST12, a pupil pattern is selected that is the same as the exit pupil distance acquired by the communication unit 34B in step ST11. Note that, in a case where there is no pupil pattern that is the same as the exit pupil distance acquired by the communication unit 34B in step ST11, a pupil pattern closest is selected. Here, it is assumed that a pupil pattern corresponding to the line S1 is selected. In this case, as illustrated in FIG. 11, amounts of light received by the phase difference detection pixel A and the phase difference detection pixel B arranged in the line S1 are substantially equal to each other, but amounts of light received by the phase difference detection pixel A and the phase difference detection pixel B arranged in the line S2 are uneven. Then, the processing proceeds to step ST13.

In step ST13, the luminance is calculated on the basis of a predetermined image. For example, an image subjected to processing by the camera processing circuit 32 is supplied to the control unit 34. The luminance calculation unit 34C calculates a luminance of the supplied image. Then, the processing proceeds to step ST14.

In step ST14, it is determined whether or not the luminance is less than or equal to a predetermined value. Here, in a case where the luminance is less than or equal to the predetermined value, the processing proceeds to step ST15.

In step ST15, for example, the designated pupil line S1, and the lines S0 and S2 that are not the designated pupil line (different pupil) and are adjacent to the designated pupil line S1 are set as lines used for autofocus. Then, the outputs of the phase difference detection pixels A arranged in the designated pupil line S1, the lines S0 and S2 are added together, and the addition value is divided by three that is the number of lines. Furthermore, the outputs of the phase difference detection pixels B arranged in the designated pupil line S1, the lines S0 and S2 are added together, and divided by three that is the number of lines. Then, the processing proceeds to step ST17.

On the other hand, in a case where the luminance is not less than or equal to the predetermined value in determination processing in step ST12, the processing proceeds to step ST16. In step ST16, the outputs of the phase difference detection pixels A and the phase difference detection pixels B arranged in the designated pupil line S1 are each added together. Then, the processing proceeds to step ST17.

In step ST17, the phase difference is detected on the basis of the calculation result in step ST15 or step ST16. For example, a pair of images (for example, output waveforms) are generated on the basis of the calculation result regarding the phase difference detection pixel A and the calculation result regarding the phase difference detection pixel B. Then, the AF control unit 34A detects the phase difference by measuring the difference between the pair of images (amount of shift between the images). Then, the processing proceeds to step ST18.

In step ST18, the AF control unit 34A calculates the amount of defocus (DF amount) on the basis of the phase difference detection result in step ST17. Then, the processing proceeds to step ST19.

In step ST19, a control signal indicating a driving amount of the imaging lens 22 is supplied from the AF control unit 34A to the lens drive mechanism 22A. In other words, a driving direction and driving amount of the imaging lens 22 are calculated by the AF control unit 34A to cancel the amount of defocus calculated in step ST18, and the control signal based on the calculation result is supplied from the AF control unit 34A to the lens drive mechanism 22A. Then, the processing proceeds to step ST20.

In step ST20, the lens drive mechanism 22A operates in accordance with the control signal supplied from the control unit 34, whereby the imaging lens 22 is driven to a focusing position, and autofocus is executed. Then, the processing proceeds to step ST21, and autofocus is ended.

2. MODIFICATIONS

The embodiment of the present disclosure has been specifically described above; however, the present disclosure is not limited to the embodiment described above, and various modifications can be made based on the technical idea of the present disclosure.

In the above-described embodiment, the example has been described in which the output of the different pupil line is added to the output of the designated pupil line and averaged; however, this is not a limitation. For example, a weighted average may be used. As a specific example, weighting may be performed so that the weight is increased for the outputs of the phase difference detection pixels of the designated pupil line, and weighting may be performed so that the weight is decreased for the outputs of the phase difference detection pixels of the different pupil line, and those outputs may be added together and averaged. Furthermore, only addition may be performed simply without taking the average of the outputs of the phase difference detection pixels.

In the above-described embodiment, the example of 8-division pupil division has been described; however, this is not a limitation, and an appropriate number of divisions can be used. Furthermore, the arrangement of the phase difference detection pixels in the imaging element 12A is not limited to the arrangement example described in the above-described embodiment, and can be changed as appropriate. Moreover, the different pupil line added to the output of the designated pupil line and averaged may be only one of the lines adjacent to the designated pupil line.

In the above-described embodiment, the example has been described in which the distance measurement information acquired by the control unit 34 is used for autofocus; however, this is not a limitation. For example, distance measurement information may be displayed on the image for focus assist.

In the above-described embodiment, the example has been described in which the phase difference detection pixels different in phase difference characteristic are arranged along the line direction (horizontal direction); however, the phase difference detection pixels different in phase difference characteristic may be arranged in the column direction (vertical direction).

In the embodiment described above, the control unit 34 may add together outputs of a plurality of phase difference detection pixels closest in the vertical direction.

The imaging device in the above-described embodiment can be applied to an imaging device that performs autofocus, for example, a medical imaging device such as a microscope, an imaging device incorporated in a smartphone, a computer device, a game device, a robot, a security camera, or a mobile body (vehicle, train, airplane, helicopter, small flying object, construction vehicle, agricultural vehicle, and the like), an imaging device for business, and the like.

The present disclosure can be implemented by a signal processing device (for example, a one-chip microcomputer) having the control unit 34, and can also be implemented as an imaging system including a plurality of devices, and, in addition, can also be implemented by a method, a program, or the like. For example, a program that performs control described in the embodiment is made to be downloadable, and an imaging device (for example, an imaging device included in a smartphone) not having the control function described in the embodiment downloads and installs the program, whereby the control described in the embodiment can be performed in the imaging device.

The present disclosure can also adopt the following configurations.

(1)

A signal processing device including a control unit that acquires distance measurement information on the basis of an addition value obtained by adding together outputs of a plurality of phase difference detection pixels supplied from an imaging element in which the plurality of phase difference detection pixels different in phase difference characteristic is arranged.

(2)

The signal processing device according to (1), in which the control unit executes autofocus on the basis of the distance measurement information.

(3)

The signal processing device according to (1) or (2), in which the control unit adds together the outputs of the phase difference detection pixels different in the phase difference characteristic.

(4)

The signal processing device according to (3), in which the control unit adds together the outputs of the phase difference detection pixels different in the phase difference characteristic depending on whether or not an imaging condition satisfies a predetermined condition.

(5)

The signal processing device according to (4), in which the imaging condition is luminance, and the control unit adds together the outputs of the phase difference detection pixels different in the phase difference characteristic in a case where the luminance is smaller than a threshold value.

(6)

The signal processing device according to any of (1) to (5), in which the phase difference detection pixels different in the phase difference characteristic are arranged in different lines in the imaging element.

(7)

The signal processing device according to (4), in which the control unit at least adds together outputs of the phase difference detection pixels arranged in a first line and outputs of the phase difference detection pixels arranged in a second line adjacent to the first line depending on whether or not the imaging condition satisfies the predetermined condition.

(8)

The signal processing device according to (7), in which the second line includes one or two lines.

(9)

The signal processing device according to (7) or (8), in which the control unit adds together the outputs of the phase difference detection pixels arranged in the first line, the outputs of the phase difference detection pixels arranged in the second line adjacent to the first line, and outputs of the phase difference detection pixels arranged in a third line adjacent to the second line depending on whether or not the imaging condition satisfies the predetermined condition.

(10)

The signal processing device according to any of (7) to (9), in which the control unit, in a case where the imaging condition satisfies the predetermined condition, at least adds together the outputs of the phase difference detection pixels arranged in the first line and the outputs of the phase difference detection pixels arranged in the second line adjacent to the first line, and in a case where the imaging condition does not satisfy the predetermined condition, uses the outputs of the phase difference detection pixels arranged in the first line, to acquire the distance measurement information.

(11)

The signal processing device according to any of (7) to (10), in which the first line is a line in which phase difference detection pixels having phase difference characteristics corresponding to an exit pupil distance of a lens are arranged.

(12)

The signal processing device according to (11), in which the control unit sets, as the first line, the line in which the phase difference detection pixels having the phase difference characteristics corresponding to the exit pupil distance of the lens are arranged.

(13)

The signal processing device according to (12), further including a communication unit that acquires the exit pupil distance of the lens by communication, in which the control unit sets, as the first line, the line in which the phase difference detection pixels having the phase difference characteristics corresponding to the exit pupil distance of the lens acquired are arranged.

(14)

The signal processing device according to any of (1) to (13), in which the phase difference characteristic is a characteristic based on a difference in corresponding exit pupil distances.

(15)

The signal processing device according to (14), in which opening positions of the phase difference detection pixels are made different depending on the difference in the corresponding exit pupil distances.

(16)

The signal processing device according to any of (1) to (15), in which a line in which phase difference detection pixels corresponding to a predetermined phase difference characteristic are arranged is formed, with a predetermined number of lines as a cycle, in the imaging element.

(17)

The signal processing device according to any of (1) to (16), in which the control unit divides the addition value by the number of different phase difference characteristics.

(18)

An imaging device including:

an imaging optical system;

an imaging element in which a plurality of phase difference detection pixels different in phase difference characteristic and irradiated with light captured by the imaging optical system is arranged; and a control unit that acquires distance measurement information on the basis of an addition value obtained by adding together outputs of the plurality of phase difference detection pixels supplied from the imaging element.

(19)

A signal processing method including acquiring, by a control unit, distance measurement information on the basis of an addition value obtained by adding together outputs of a plurality of phase difference detection pixels supplied from an imaging element in which the plurality of phase difference detection pixels different in phase difference characteristic is arranged.

(20)

A program causing a computer to execute a signal processing method including acquiring, by a control unit, distance measurement information on the basis of an addition value obtained by adding together outputs of a plurality of phase difference detection pixels supplied from an imaging element in which the plurality of phase difference detection pixels different in phase difference characteristic is arranged.

3. APPLICATION EXAMPLE

The technology according to the present disclosure can be applied to various products. For example, the technology according to the present disclosure may be applied to an operation room system.

Figure 12:
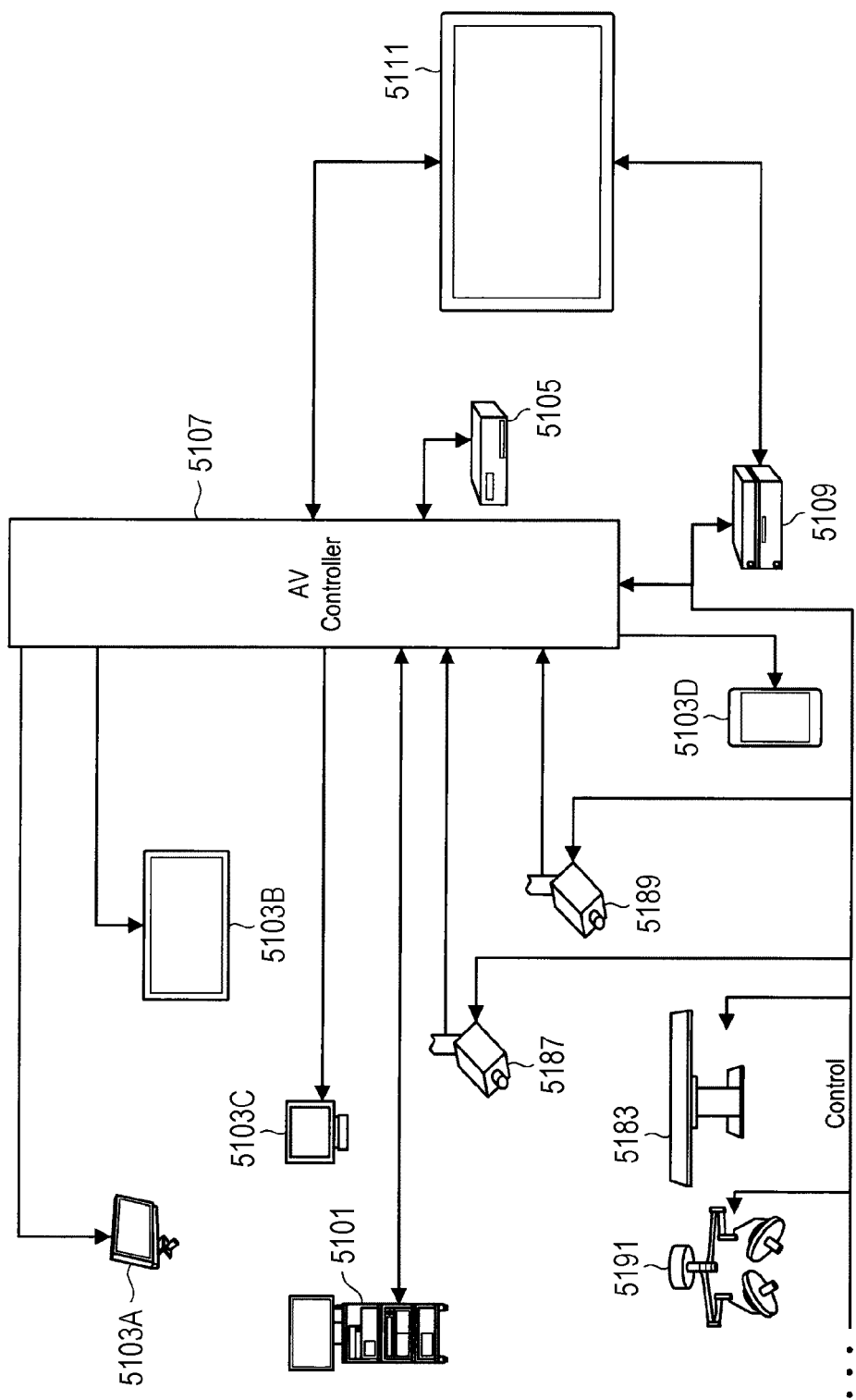
FIG. 12 is a diagram schematically illustrating an overall configuration of an operation room system.

FIG. 12 is a diagram schematically illustrating an overall configuration of an operation room system 5100 to which the technology according to the present disclosure can be applied. Referring to FIG. 12, in the operation room system 5100, devices installed in an operation room are connected to each other to be able to cooperate with each other via an audiovisual controller (AV controller) 5107 and an operation room control device 5109.

Various devices can be installed in the operation room. FIG. 12 illustrates, as an example, various devices 5101 for endoscopic surgery, a ceiling camera 5187 provided on the ceiling of the operation room and imaging an area at hand of a surgeon, an operation room camera 5189 provided on the ceiling of the operation room and imaging a state of the entire operation room, a plurality of display devices 5103A to 5103D, a recorder 5105, a patient bed 5183, and an illumination 5191.

Here, among these devices, the devices 5101 belong to an endoscopic surgical system 5113 described later, and includes an endoscope, a display device that displays an image captured by the endoscope, and the like. Each device belonging to the endoscopic surgical system 5113 is also referred to as a medical device. On the other hand, the display devices 5103A to 5103D, the recorder 5105, the patient bed 5183, and the illumination 5191 are devices provided in, for example, the operation room, separately from the endoscopic surgical system 5113. Each device that does not belong to the endoscopic surgical system 5113 is also referred to as a non-medical device. The audiovisual controller 5107 and/or the operation room control device 5109 control operations of these medical devices and non-medical devices in cooperation with each other.

The audiovisual controller 5107 comprehensively controls processing regarding image display in the medical devices and non-medical devices. Specifically, among the devices included in the operation room system 5100, the devices 5101, the ceiling camera 5187, and the operation room camera 5189 each can be a device (hereinafter also referred to as a transmission source device) having a function of transmitting information (hereinafter also referred to as display information) to be displayed during surgery. Furthermore, the display devices 5103A to 5103D each can be a device (hereinafter also referred to as an output destination device) to which the display information is output. Furthermore, the recorder 5105 can be a device corresponding to both the transmission source device and the output destination device. The audiovisual controller 5107 has functions of controlling operations of the transmission source device and the output destination device, to acquire the display information from the transmission source device and transmit the display information to the output destination device for display or recording. Note that, the display information is various images captured during the surgery, and various types of information regarding the surgery (for example, patient's physical information, the past examination results, information about a surgical method, and the like) and the like.

Specifically, information about the image of the surgical portion in a body cavity of the patient captured by the endoscope is transmitted as display information from the devices 5101 to the audiovisual controller 5107. Furthermore, information about the image of the area at hand of the surgeon captured by the ceiling camera 5187 can be transmitted as display information from the ceiling camera 5187. Furthermore, information about the image indicating the state of the entire operation room captured by the operation room camera 5189 can be transmitted as display information from the operation room camera 5189. Note that, in a case where there is another device having an imaging function in the operation room system 5100, the audiovisual controller 5107 may acquire information about an image captured by the other device from the other device, as display information.

Alternatively, for example, information about these images captured in the past is recorded in the recorder 5105 by the audiovisual controller 5107. The audiovisual controller 5107 can acquire information about the image captured in the past from the recorder 5105 as display information. Note that, various types of information regarding surgery may also be recorded in advance in the recorder 5105.

The audiovisual controller 5107 causes at least one of the display devices 5103A to 5103D that are output destination devices to display the acquired display information (in other words, images captured during the surgery, and various types of information regarding the surgery). In the illustrated example, the display device 5103A is a display device installed to be suspended from the ceiling of the operation room, the display device 5103B is a display device installed on the wall of the operation room, the display device 5103C is a display device installed on a desk in the operation room, and the display device 5103D is a mobile device (for example, a tablet personal computer (PC)) having a display function.

Furthermore, although illustration is omitted in FIG. 12, the operation room system 5100 may include devices outside the operation room. The devices outside the operation room can be, for example, a server connected to a network built inside and outside a hospital, a PC used by a medical staff, a projector installed in a conference room of the hospital, and the like. In a case where such an external device is outside the hospital, the audiovisual controller 5107 can also cause a display device of another hospital to display the display information via a video conference system or the like, for telemedicine.

The operation room control device 5109 comprehensively controls processing other than the processing regarding the image display in the non-medical devices. For example, the operation room control device 5109 controls drive of the patient bed 5183, the ceiling camera 5187, the operation room camera 5189, and the illumination 5191.

A centralized operation panel 5111 is provided in the operation room system 5100, and a user can give an instruction about image display to the audiovisual controller 5107 via the centralized operation panel 5111, or an instruction about operation of the non-medical device to the operation room control device 5109. The centralized operation panel 5111 is configured as a touch panel provided on the display surface of the display device.

Figure 13:
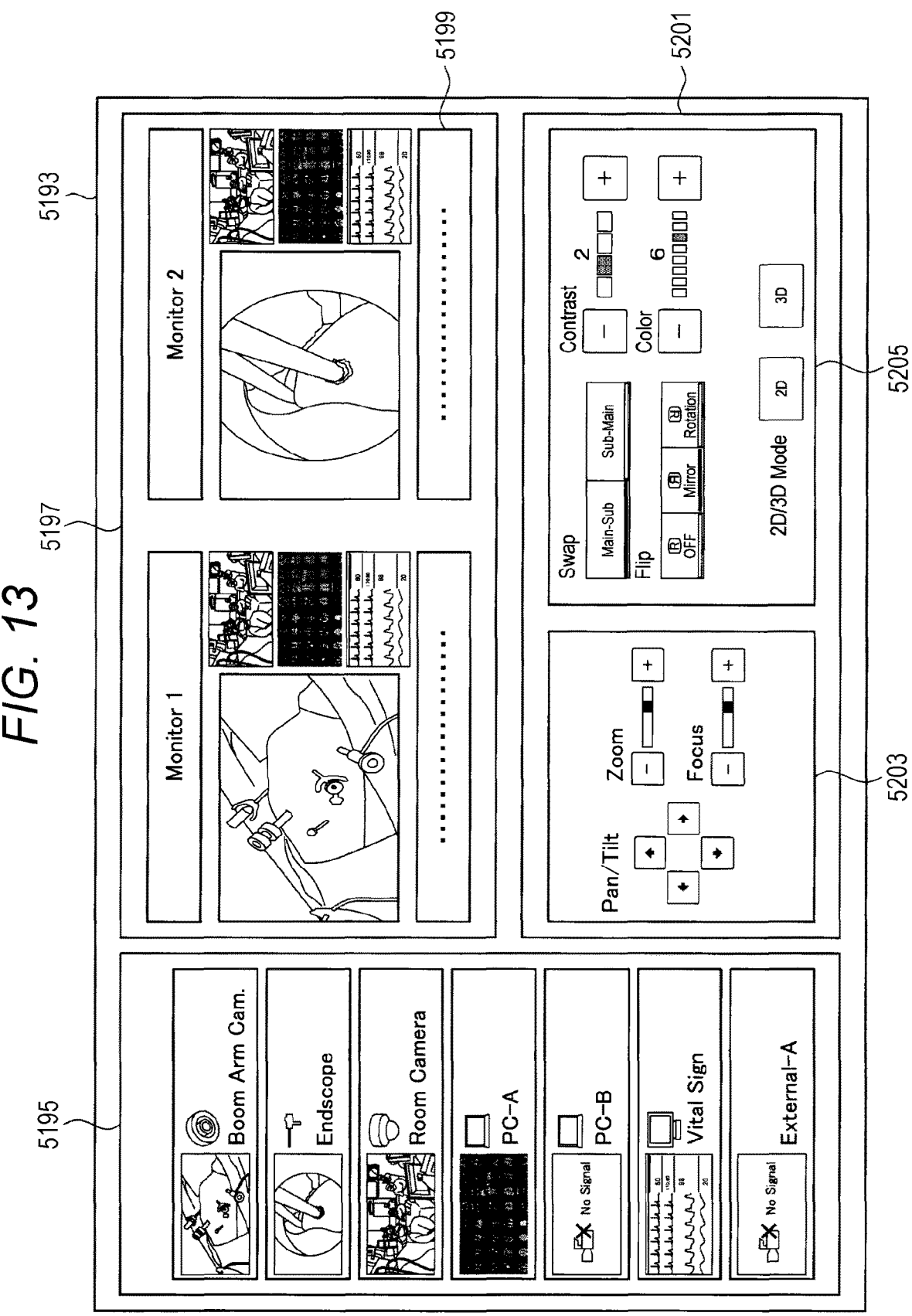
FIG. 13 is a diagram illustrating a display example of an operation screen on a centralized operation panel.

FIG. 13 is a diagram illustrating a display example of an operation screen on the centralized operation panel 5111. In FIG. 13, as an example, the operation screen is illustrated corresponding to a case where the operation room system 5100 is provided with two display devices as the output destination devices. Referring to FIG. 13, an operation screen 5193 is provided with a transmission source selection area 5195, a preview area 5197, and a control area 5201.

In the transmission source selection area 5195, the transmission source devices included in the operation room system 5100 and respective thumbnail screens representing the display information of the transmission source devices are displayed in association with each other. The user can select the display information to be displayed on the display device from any of the transmission source devices displayed in the transmission source selection area 5195.

In the preview area 5197, previews are displayed of screens displayed on the respective two display devices (Monitor 1 and Monitor 2) that are output destination devices. In the illustrated example, four images are PinP-displayed in one display device. The four images correspond to the display information transmitted from the transmission source device selected in the transmission source selection area 5195. Among the four images, one is displayed relatively large as a main image, and the remaining three are displayed relatively small as sub-images. The user can switch the main image and the sub-images with each other by appropriately selecting one of four areas in which the respective images are displayed. Furthermore, a status display area 5199 is provided below an area in which the four images are displayed, and a status regarding the surgery (for example, an elapsed time of the surgery, the patient's physical information, and the like) is displayed in the area as appropriate.

The control area 5201 is provided with a transmission source operation area 5203 in which graphical user interface (GUI) components are displayed for performing operation to the transmission source device, and an output destination operation area 5205 in which GUI components are displayed for performing operation to the output destination device. In the illustrated example, in the transmission source operation area 5203, the GUI components are provided for performing various operations (pan, tilt, and zoom) to a camera in the transmission source device having an imaging function. The user can operate the operation of the camera in the transmission source device by appropriately selecting these GUI components. Note that, although not illustrated, in a case where the transmission source device selected in the transmission source selection area 5195 is a recorder (in other words, in a case where an image recorded in the recorder in the past is displayed on the preview area 5197), a GUI component for performing operations such as reproduction, reproduction stop, rewind, and fast-forward of the image can be provided in the transmission source operation area 5203.

Furthermore, in the output destination operation area 5205, the GUI components are provided for performing various operations (swap, flip, color adjustment, contrast adjustment, switching between 2D display and 3D display) to a display on the display device that is the output destination device. The user can operate the display on the display device by appropriately selecting these GUI components.

Note that, the operation screen displayed on the centralized operation panel 5111 is not limited to the illustrated example, and the user may be capable of operation input to each device that may be controlled by the audiovisual controller 5107 and the operation room control device 5109 included in the operation room system 5100 via the centralized operation panel 5111.

Figure 14:
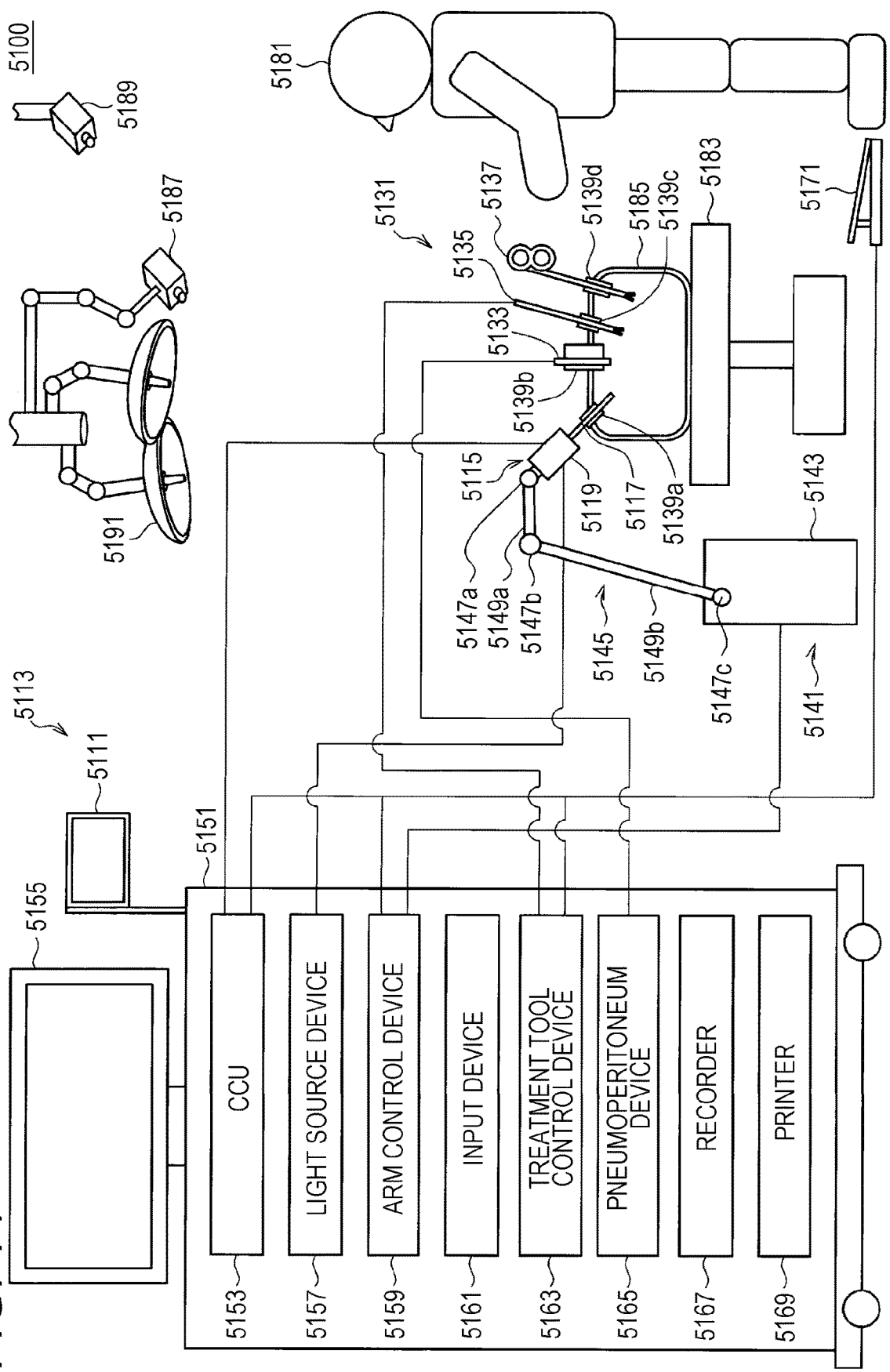
FIG. 14 is a diagram illustrating an example of a state of surgery to which the operation room system is applied.

FIG. 14 is a diagram illustrating an example of a state of surgery to which the operation room system described above is applied. The ceiling camera 5187 and the operation room camera 5189 are provided on the ceiling of the operation room, and can image the state of the area at hand of a surgeon (surgeon) 5181 who performs treatment on an affected part of a patient 5185 on the patient bed 5183, and the entire operation room. The ceiling camera 5187 and the operation room camera 5189 can be provided with a magnification adjustment function, a focal length adjustment function, an imaging direction adjustment function, and the like. The illumination 5191 is provided on the ceiling of the operation room, and irradiates at least the area at hand of the surgeon 5181. The illumination 5191 may be enabled to appropriately adjust the amount of irradiation light, the wavelength (color) of the irradiation light, the irradiation direction of the light, and the like.

As illustrated in FIG. 12, the endoscopic surgical system 5113, the patient bed 5183, the ceiling camera 5187, the operation room camera 5189, and the illumination 5191 are connected to each other to be able to cooperate with each other via the audiovisual controller 5107 and the operation room control device 5109 (not illustrated in FIG. 14). The centralized operation panel 5111 is provided in the operation room, and as described above, the user can appropriately operate these devices existing in the operation room via the centralized operation panel 5111.

Hereinafter, a configuration of the endoscopic surgical system 5113 will be described in detail. As illustrated, the endoscopic surgical system 5113 includes an endoscope 5115, other surgical tools 5131, a support arm device 5141 that supports the endoscope 5115, and a cart 5151 on which various devices for endoscopic surgery are mounted.

In endoscopic surgery, instead of performing laparotomy by incising an abdominal wall, a plurality of cylindrical opening devices called trocars 5139*a* to 5139*d* punctures the abdominal wall. Then, a lens barrel 5117 of the endoscope 5115 and the other surgical tools 5131 are inserted into a body cavity of the patient 5185 from the trocars 5139*a* to 5139*d*. In the illustrated example, a pneumoperitoneum tube 5133, an energy treatment tool 5135, and forceps 5137 are inserted into the body cavity of the patient 5185 as the other surgical tools 5131. Furthermore, the energy treatment tool 5135 is a treatment tool that performs incision and peeling of tissue, sealing of a blood vessel, or the like by a high-frequency current or ultrasonic vibration. However, the surgical tools 5131 illustrated are merely examples, and various surgical tools generally used in endoscopic surgery may be used as the surgical tools 5131, for example, tweezers, a retractor, and the like.

An image of a surgical portion in the body cavity of the patient 5185 imaged by the endoscope 5115 is displayed on a display device 5155. The surgeon 5181 performs a treatment, for example, excising the affected part, or the like, by using the energy treatment tool 5135 and the forceps 5137 while viewing the image of the surgical portion displayed on the display device 5155 in real time. Note that, although not illustrated, the pneumoperitoneum tube 5133, the energy treatment tool 5135, and the forceps 5137 are supported by the surgeon 5181, an assistant, or the like during the surgery.

(Support Arm Device)

The support arm device 5141 includes an arm 5145 extending from a base 5143. In the illustrated example, the arm 5145 includes joints 5147*a*, 5147*b*, and 5147*c* and links 5149*a* and 5149*b*, and is driven by control of an arm control device 5159. The endoscope 5115 is supported by the arm 5145, and its position and posture are controlled. As a result, stable position fixing can be implemented of the endoscope 5115.

The endoscope 5115 includes the lens barrel 5117 in which a region of a predetermined length from the distal end is inserted into the body cavity of the patient 5185, and a camera head 5119 connected to the proximal end of the lens barrel 5117. In the illustrated example, the endoscope 5115 formed as a so-called rigid scope including the rigid lens barrel 5117 is illustrated, but the endoscope 5115 may be formed as a so-called flexible scope including the flexible lens barrel 5117.

At the distal end of the lens barrel 5117, an opening is provided into which an objective lens is fitted. A light source device 5157 is connected to the endoscope 5115, and light generated by the light source device 5157 is guided to the distal end of the lens barrel by a light guide extending inside the lens barrel 5117, and the light is emitted toward an observation target in the body cavity of the patient 5185 via the objective lens. Note that, the endoscope 5115 may be a forward-viewing endoscope, an oblique-viewing endoscope, or a side-viewing endoscope.

An optical system and an imaging element are provided inside the camera head 5119, and reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 5153. Note that, in the camera head 5119, a function is installed of adjusting the magnification and the focal length by appropriately driving the optical system.

Note that, for example, to cope with stereoscopic vision (3D display) or the like, the camera head 5119 may be provided with a plurality of the imaging elements. In this case, a plurality of relay optical systems is provided inside the lens barrel 5117 to guide the observation light to each of the plurality of imaging elements.

(Various Devices Mounted on Cart)

The CCU 5153 includes a central processing unit (CPU), a graphics processing unit (GPU), and the like, and comprehensively controls operation of the endoscope 5115 and the display device 5155. Specifically, the CCU 5153 performs, on the image signal received from the camera head 5119, various types of image processing for displaying an image based on the image signal, for example, development processing (demosaic processing), and the like. The CCU 5153 provides the display device 5155 with the image signal on which the image processing is performed. Furthermore, the audiovisual controller 5107 illustrated in FIG. 12 is connected to the CCU 5153. The CCU 5153 also provides the audiovisual controller 5107 with the image signal on which the image processing is performed. Furthermore, the CCU 5153 transmits a control signal to the camera head 5119 to control its drive. The control signal can include information regarding imaging conditions such as the magnification and the focal length. The information regarding the imaging conditions may be input via an input device 5161, or may be input via the centralized operation panel 5111 described above.

The display device 5155 displays an image based on the image signal subjected to the image processing by the CCU 5153, by the control from the CCU 5153. In a case where the endoscope 5115 is compatible with high-resolution imaging, for example, 4K (the number of horizontal pixels 3840×the number of vertical pixels 2160), 8K (the number of horizontal pixels 7680×the number of vertical pixels 4320), and the like, and/or in a case where the endoscope 5115 is compatible with 3D display, as the display device 5155, corresponding to each case, a display device can be used capable of high-resolution display and/or 3D display. In a case where the display device 5155 is compatible with the high-resolution imaging such as 4K or 8K, a more immersive feeling can be obtained by using a display device having a size of greater than or equal to 55 inches. Furthermore, a plurality of the display devices 5155 having different resolutions and sizes may be provided depending on applications.

The light source device 5157 includes a light source, for example, a light emitting diode (LED) or the like, and supplies irradiation light for imaging a surgical portion to the endoscope 5115.

The arm control device 5159 includes a processor, for example, a CPU or the like, and controls drive of the arm 5145 of the support arm device 5141 in accordance with a predetermined control method by operating in accordance with a predetermined program.

The input device 5161 is an input interface to the endoscopic surgical system 5113. The user can input various types of information and instructions to the endoscopic surgical system 5113 via the input device 5161. For example, the user inputs various types of information regarding the surgery, such as the patient's physical information and information about the surgical method, via the input device 5161. Furthermore, for example, the user inputs, via the input device 5161, an instruction to drive the arm 5145, an instruction to change the imaging conditions (type of irradiation light, magnification, focal length, and the like) by the endoscope 5115, an instruction to drive the energy treatment tool 5135, and the like.

The type of the input device 5161 is not limited, and the input device 5161 may be any of various known input devices. As the input device 5161, for example, a mouse, a keyboard, a touch panel, a switch, a foot switch 5171 and/or a lever and the like can be applied. In a case where a touch panel is used as the input device 5161, the touch panel may be provided on the display surface of the display device 5155.

Alternatively, the input device 5161 is a device worn by the user, for example, a glasses-type wearable device, a head mounted display (HMD), or the like, and various inputs are performed depending on the user's gesture and line-of-sight detected by these devices. Furthermore, the input device 5161 includes a camera enabled to detect the user's movement, and various inputs are performed depending on the user's gesture and line-of-sight detected from a video captured by the camera. Moreover, the input device 5161 includes a microphone enabled to pick up a user's voice, and various inputs are performed by voice via the microphone. As described above, the input device 5161 is enabled to input various information without contact, whereby in particular the user (for example, the surgeon 5181) belonging to a clean area can operate a device belonging to an unclean area without contact. Furthermore, since the user can operate the device without releasing the user's hand from the surgical tool, convenience of the user is improved.

A treatment tool control device 5163 controls drive of the energy treatment tool 5135 for cauterization of tissue, incision, sealing of blood vessels, or the like. A pneumoperitoneum device 5165 injects a gas into the body cavity of the patient 5185 via the pneumoperitoneum tube 5133 to inflate the body cavity, for the purpose of securing a visual field by the endoscope 5115 and securing a working space of the surgeon. A recorder 5167 is a device enabled to record various types of information regarding surgery. A printer 5169 is a device enabled to print various types of information regarding surgery in various formats such as text, image, graph, and the like.

Hereinafter, a particularly characteristic configuration in the endoscopic surgical system 5113 will be described in detail.

(Support Arm Device)

The support arm device 5141 includes the base 5143 that is a base, and the arm 5145 extending from the base 5143. In the illustrated example, the arm 5145 includes the plurality of joints 5147a, 5147b, and 5147c, and the plurality of links 5149a and 5149b coupled together by the joint 5147b, but in FIG. 14, for simplicity, the configuration of the arm 5145 is simplified and illustrated. Actually, the shape, number, and arrangement of the joints 5147a to 5147c and the links 5149a and 5149b, the direction of the rotation axis of the joints 5147a to 5147c, and the like are appropriately set so that the arm 5145 has a desired degree of freedom. For example, the arm 5145 can suitably have 6 degrees of freedom or more. As a result, the endoscope 5115 can be freely moved within the movable range of the arm 5145, so that the lens barrel 5117 of the endoscope 5115 can be inserted into the body cavity of the patient 5185 from a desired direction.

The joints 5147a to 5147c each are provided with an actuator, and the joints 5147a to 5147c each are rotatable around a predetermined rotation axis by drive of the actuator. The drive of the actuator is controlled by the arm control device 5159, whereby the rotation angle of each of the joints 5147a to 5147c is controlled, and the drive of the arm 5145 is controlled. As a result, control of the position and posture of the endoscope 5115 can be implemented. At this time, the arm control device 5159 can control the drive of the arm 5145 by various known control methods such as force control or position control.

For example, the surgeon 5181 performs operation input appropriately via the input device 5161 (including the foot switch 5171), whereby the drive of the arm 5145 may be appropriately controlled by the arm control device 5159 depending on the operation input, and the position and posture of the endoscope 5115 may be controlled. By the control, the endoscope 5115 at the distal end of the arm 5145 can be moved from an arbitrary position to an arbitrary position, and then fixedly supported at the position after the movement. Note that, the arm 5145 may be operated by a so-called master slave method. In this case, the arm 5145 can be remotely operated by the user via the input device 5161 installed at a location away from the operation room.

Furthermore, in a case where force control is applied, the arm control device 5159 may perform so-called power assist control in which external force is received from the user, and the actuator of each of the joints 5147a to 5147c is driven so that the arm 5145 moves smoothly following the external force. As a result, when the user moves the arm 5145 while directly touching the arm 5145, the arm 5145 can be moved with a relatively light force. Thus, the endoscope 5115 can be moved more intuitively and with a simpler operation, and the convenience for the user can be improved.

Here, in general, in the endoscopic surgery, the endoscope 5115 is supported by a surgeon called a scopist. In contrast, by using the support arm device 5141, the position of the endoscope 5115 can be more reliably fixed without relying on human hands, so that an image of the surgical portion can be stably obtained, and the surgery can be smoothly performed.

Note that, the arm control device 5159 is not necessarily provided in the cart 5151. Furthermore, the arm control device 5159 does not necessarily have to be one device. For example, the arm control device 5159 may be provided at each of the joints 5147a to 5147c of the arm 5145 of the support arm device 5141, and a plurality of the arm control devices 5159 cooperates with each other, whereby drive control of the arm 5145 may be implemented.

(Light Source Device)

The light source device 5157 supplies the endoscope 5115 with irradiation light when a surgical portion is imaged. The light source device 5157 includes a white light source including, for example, an LED, a laser light source, or a combination thereof. At this time, in a case where the white light source includes a combination of R, G, and B laser light sources, the output intensity and the output timing of each color (each wavelength) can be controlled with high accuracy, so that adjustment can be performed of the white balance of the captured image in the light source device 5157. Furthermore, in this case, it is also possible to capture an image corresponding to each of R, G, and B in time division by emitting the laser light from each of the R, G, and B laser light sources in time division to the observation target, and controlling drive of the imaging element of the camera head 5119 in synchronization with the emission timing. According to this method, a color image can be obtained without providing a color filter in the imaging element.

Furthermore, drive of the light source device 5157 may be controlled such that the intensity of light to be output is changed at predetermined time intervals. By controlling the drive of the imaging element of the camera head 5119 in synchronization with the change timing of the light intensity to acquire images in time division, and synthesizing the images, a high dynamic range image can be generated without so-called blocked up shadows or blown out highlights.

Furthermore, the light source device 5157 may be able to supply light of a predetermined wavelength band corresponding to special light observation. In the special light observation, for example, by using wavelength dependence of light absorption in a body tissue, by emitting narrow band light compared to irradiation light (in other words, white light) at the time of ordinary observation, so-called narrow band imaging is performed in which a predetermined tissue such as a blood vessel in a mucosal surface layer is imaged with high contrast. Alternatively, in the special light observation, fluorescence observation may be performed that obtain an image by fluorescence generated by emitting excitation light. In the fluorescence observation, it is possible to irradiate a body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 5157 may be able to supply narrow band light and/or excitation light corresponding to such special light observation.

(Camera Head and CCU)

Figure 15:
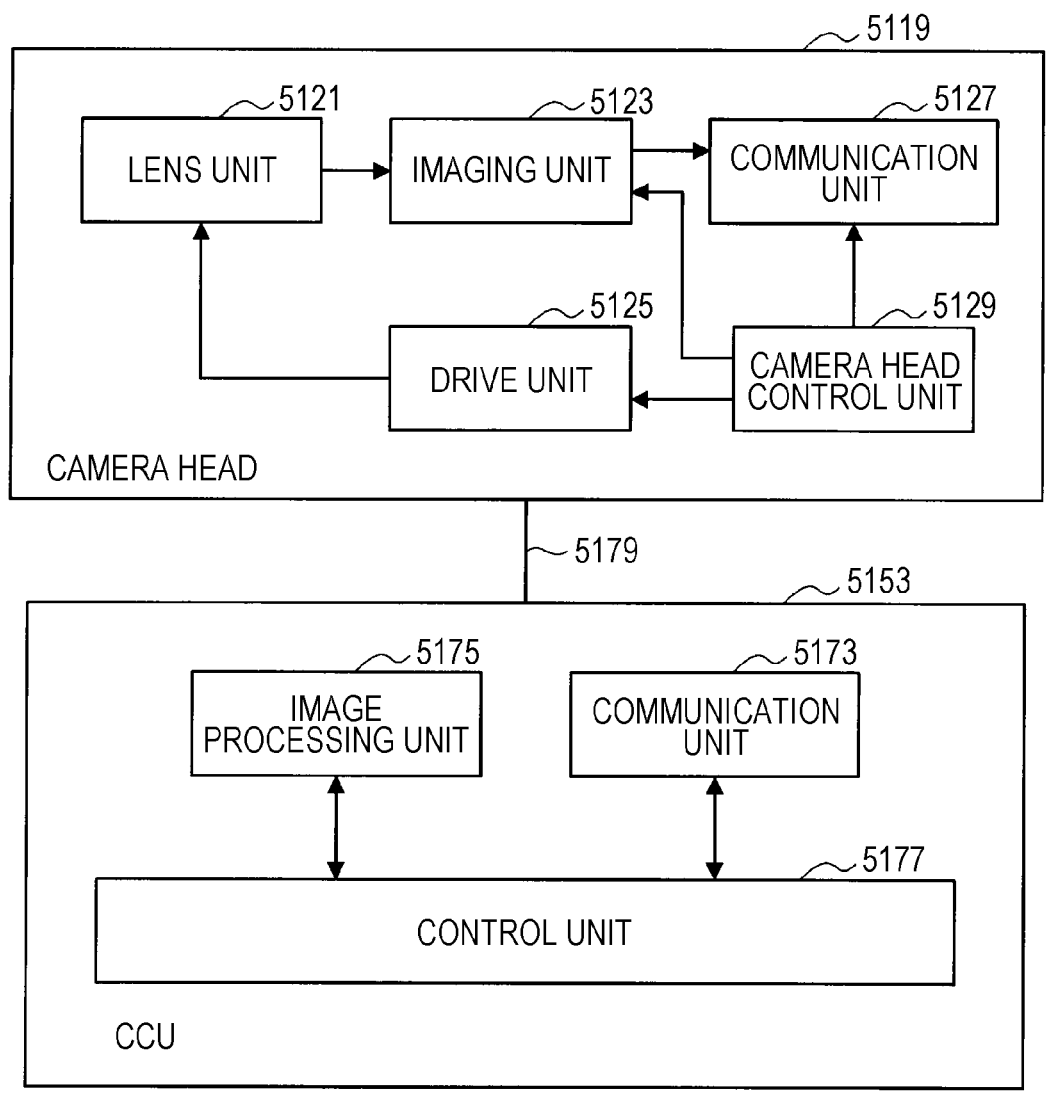
FIG. 15 is a block diagram illustrating an example of a functional configuration of a camera head and a CCU illustrated in FIG. 14.

The functions of the camera head 5119 and the CCU 5153 of the endoscope 5115 will be described in more detail with reference to FIG. 15. FIG. 15 is a block diagram illustrating an example of a functional configuration of the camera head 5119 and the CCU 5153 illustrated in FIG. 14.

Referring to FIG. 15, the camera head 5119 includes, as its functions, a lens unit 5121, an imaging unit 5123, a drive unit 5125, a communication unit 5127, and a camera head control unit 5129. Furthermore, the CCU 5153 includes, as its functions, a communication unit 5173, an image processing unit 5175, and a control unit 5177. The camera head 5119 and the CCU 5153 are communicably connected to each other by a transmission cable 5179.

First, the functional configuration of the camera head 5119 will be described. The lens unit 5121 is an optical system provided at a connection portion with the lens barrel 5117. The observation light captured from the distal end of the lens barrel 5117 is guided to the camera head 5119 and is incident on the lens unit 5121. The lens unit 5121 includes a combination of a plurality of lenses including a zoom lens and a focus lens. Optical characteristics of the lens unit 5121 are adjusted so that the observation light is focused on the light receiving surface of the imaging element of the imaging unit 5123. Furthermore, positions on the optical axis of the zoom lens and the focus lens are movable to adjust the magnification and focus of a captured image.

The imaging unit 5123 includes an imaging element, and is arranged at the subsequent stage of the lens unit 5121. The observation light passing through the lens unit 5121 is focused on the light receiving surface of the imaging element, and an image signal corresponding to the observation image is generated by photoelectric conversion. The image signal generated by the imaging unit 5123 is provided to the communication unit 5127.

As the imaging element constituting the imaging unit 5123, for example, an element is used that is a complementary metal oxide semiconductor (CMOS) type image sensor, and is capable of color imaging having a Bayer array. Note that, as the imaging element, an element may be used compatible with imaging of the high-resolution image of greater than or equal to 4K, for example. The image of the surgical portion is obtained with high resolution, whereby the surgeon 5181 can grasp a state of the surgical portion in more detail, and can perform the surgery more smoothly.

Furthermore, the imaging element constituting the imaging unit 5123 includes a pair of imaging elements for acquiring image signals for the right-eye and left-eye to cope with 3D display. By performing the 3D display, the surgeon 5181 can grasp the depth of living tissue in a surgical portion more accurately. Note that, in a case where the imaging unit 5123 includes a multi-chip imaging element, a plurality of systems of the lens units 5121 is provided corresponding to respective imaging elements.

Furthermore, the imaging unit 5123 is not necessarily provided in the camera head 5119. For example, the imaging unit 5123 may be provided inside the lens barrel 5117 immediately after the objective lens.

The drive unit 5125 includes an actuator and moves the zoom lens and the focus lens of the lens unit 5121 by a predetermined distance along the optical axis by control of the camera head control unit 5129. As a result, the magnification and the focus of the captured image by the imaging unit 5123 can be appropriately adjusted.

The communication unit 5127 includes a communication device for transmitting/receiving various types of information to/from the CCU 5153. The communication unit 5127 transmits the image signal obtained from the imaging unit 5123 as RAW data to the CCU 5153 via the transmission cable 5179. At this time, to display the captured image of the surgical portion with low latency, the image signal is preferably transmitted by optical communication. This is because it is required that a video image of the surgical portion is displayed in real time as much as possible for safer and more reliable surgery since the surgeon 5181 performs the surgery while observing a state of the affected part with the captured image during the surgery. In a case where optical communication is performed, the communication unit 5127 is provided with a photoelectric conversion module that converts an electric signal into an optical signal. The image signal is converted into an optical signal by the photoelectric conversion module, and then transmitted to the CCU 5153 via the transmission cable 5179.

Furthermore, the communication unit 5127 receives the control signal for controlling the drive of the camera head 5119 from the CCU 5153. The control signal includes information regarding imaging conditions, for example, information that specifies the frame rate of the captured image, information that specifies the exposure value at the time of imaging, and/or information that specifies the magnification and focus of the captured image. The communication unit 5127 provides the received control signal to the camera head control unit 5129. Note that, the control signal from the CCU 5153 may also be transmitted by optical communication. In this case, the communication unit 5127 is provided with a photoelectric conversion module that converts an optical signal into an electric signal, and the control signal is converted into an electric signal by the photoelectric conversion module and then provided to the camera head control unit 5129.

Note that, the above-described imaging conditions such as the frame rate, the exposure value, the magnification, and the focus are automatically set by the control unit 5177 of the CCU 5153 on the basis of the image signal acquired. That is, a so-called auto exposure (AE) function, auto-focus (AF) function, and auto white balance (AWB) function are installed in the endoscope 5115.

The camera head control unit 5129 controls the drive of the camera head 5119 on the basis of the control signal from the CCU 5153 received via the communication unit 5127. For example, the camera head control unit 5129 controls drive of the imaging element of the imaging unit 5123 on the basis of the information that specifies the frame rate of the captured image and/or the information that specifies the exposure at the time of imaging. Furthermore, for example, the camera head control unit 5129 appropriately moves the zoom lens and focus lens of the lens unit 5121 via the drive unit 5125 on the basis of the information that specifies the magnification and focus of the captured image. The camera head control unit 5129 may further have a function of storing information for identifying the lens barrel 5117 and the camera head 5119.

Note that, the camera head 5119 can be made to have resistance to autoclave sterilization by arranging the lens unit 5121, the imaging unit 5123, and the like in a sealed structure with high airtightness and waterproofness.

Next, the functional configuration of the CCU 5153 will be described. The communication unit 5173 includes a communication device for transmitting/receiving various types of information to/from the camera head 5119. The communication unit 5173 receives the image signal transmitted from the camera head 5119 via the transmission cable 5179. At this time, as described above, the image signal can be suitably transmitted by optical communication. In this case, to be adaptable to optical communication, the communication unit 5173 is provided with a photoelectric conversion module that converts an optical signal into an electric signal. The communication unit 5173 provides the image signal converted into the electric signal to the image processing unit 5175.

Furthermore, the communication unit 5173 transmits the control signal for controlling the drive of the camera head 5119 to the camera head 5119. The control signal may also be transmitted by optical communication.

The image processing unit 5175 performs various types of image processing on the image signal that is RAW data transmitted from the camera head 5119. Examples of the image processing includes various types of known signal processing, for example, development processing, image quality enhancement processing (such as band enhancement processing, super-resolution processing, noise reduction (NR) processing and/or camera shake correction processing), and/or enlargement processing (electronic zoom processing), and the like. Furthermore, the image processing unit 5175 performs detection processing on the image signal for performing AE, AF, and AWB.

The image processing unit 5175 includes a processor such as a CPU or GPU, and the image processing and detection processing described above can be performed by the processor operating in accordance with a predetermined program. Note that, in a case where the image processing unit 5175 includes a plurality of GPUs, the image processing unit 5175 appropriately divides information related to the image signal and performs the image processing in parallel by the plurality of GPUs.

The control unit 5177 performs various types of control regarding imaging of the surgical portion by the endoscope 5115 and display of the captured image. For example, the control unit 5177 generates the control signal for controlling the drive of the camera head 5119. At this time, in a case where the imaging condition is input by the user, the control unit 5177 generates the control signal on the basis of the input by the user. Alternatively, in a case where the AE function, the AF function, and the AWB function are installed in the endoscope 5115, the control unit 5177 generates the control signal by appropriately calculating the optimum exposure value, focal length, and white balance depending on a result of the detection processing by the image processing unit 5175.

Furthermore, the control unit 5177 causes the display device 5155 to display the image of the surgical portion on the basis of the image signal subjected to the image processing by the image processing unit 5175. At this time, the control unit 5177 recognizes various objects in the surgical portion image by using various image recognition technologies. For example, the control unit 5177 detects color, a shape of an edge, and the like of the object included in the surgical portion image, thereby being able to recognize the surgical tools such as the forceps, a specific body part, bleeding, mist at the time of using the energy treatment tool 5135, or the like. When causing the display device 5155 to display the image of the surgical portion, the control unit 5177 causes the display device 5155 to superimpose and display various types of surgery assistance information on the image of the surgical portion by using the recognition result. The surgery assistance information is superimposed and displayed, and presented to the surgeon 5181, whereby the surgery can be performed more safely and reliably.

The transmission cable 5179 connecting the camera head 5119 and the CCU 5153 together is an electric signal cable adaptable to communication of electric signals, an optical fiber adaptable to optical communication, or a composite cable thereof.

Here, in the illustrated example, communication is performed by wire using the transmission cable 5179, but communication between the camera head 5119 and the CCU 5153 may be performed wirelessly. In a case where the communication between the two is performed wirelessly, it is not necessary to install the transmission cable 5179 in the operation room, so that a situation can be eliminated where the movement of the medical staff in the operation room is hindered by the transmission cable 5179.

In the above, the example has been described of the operation room system 5100 to which the technology according to the present disclosure can be applied. Note that, here, as an example, the case has been described where the medical system to which the operation room system 5100 is applied is the endoscopic surgical system 5113, but the configuration of the operation room system 5100 is not limited to such an example. For example, the operation room system 5100 may be applied to an inspection flexible endoscope system or a microscopic surgical system instead of the endoscopic surgical system 5113.

The technology according to the present disclosure can be suitably applied to the ceiling camera 5187, the operation room camera 5189, the CCU 5153, and the like among the configurations described above. Specifically, by applying the technology according to the present disclosure to the control unit 5177 of the CCU 5153, various objects in the surgical portion image can be clearly displayed.

REFERENCE SIGNS LIST

1 Imaging device
12A Imaging element
12B Image plane phase difference AF sensor
20 Optical imaging system
22 Imaging lens
22A Lens drive mechanism
34 Control unit
34A AF control unit
34B Communication unit
A, B Phase difference detection pixel

The invention claimed is:

1. A signal processing device comprising:
a controller configured to
acquire distance measurement information on a basis of an addition value obtained by adding together outputs of a plurality of phase difference detection pixels supplied from an imaging element in which the plurality of phase difference detection pixels is arranged,
the plurality of phase difference detection pixels respectively having different phase difference characteristics,
add together the outputs of the phase difference detection pixels arranged in a first line and outputs of the phase difference detection pixels arranged in a second line adjacent to the first line depending on whether or not an imaging condition satisfies a predetermined condition,
set, as the first line, the line in which the phase difference detection pixels having the phase difference characteristics corresponding to an exit pupil distance of a lens are arranged, and acquire the exit pupil distance of the lens by communication.

2. The signal processing device according to claim 1, wherein
the imaging condition is luminance, and
the controller adds together the outputs of the phase difference detection pixels different in the phase difference characteristic in a case where the luminance is smaller than a threshold value.

3. The signal processing device according to claim 1, wherein the second line includes one or two lines.

4. The signal processing device according to claim 1, wherein the controller,
in a case where the imaging condition satisfies the predetermined condition, at least adds together the outputs of the phase difference detection pixels arranged in the first line and the outputs of the phase difference detection pixels arranged in the second line adjacent to the first line, and
in a case where the imaging condition does not satisfy the predetermined condition, uses the outputs of the phase difference detection pixels arranged in the first line, to acquire the distance measurement information.

5. The signal processing device according to claim 1, wherein
opening positions of the phase difference detection pixels are made different depending on the difference in the corresponding exit pupil distances.

6. The signal processing device according to claim 1, wherein predetermined number of lines as a cycle is formed in the imaging element.

7. The signal processing device according to claim 1, wherein
the controller divides the addition value by a number of different phase difference characteristics.

8. An imaging device comprising:
an imaging optical system;
an imaging element in which a plurality of phase difference detection pixels is arranged,
the plurality of phase difference detection pixels respectively having different phase difference characteristics and irradiated with light captured by the imaging optical system; and
a controller configured to
acquire distance measurement information on a basis of an addition value obtained by adding together outputs of the plurality of phase difference detection pixels supplied from the imaging element,
add together the outputs of the phase difference detection pixels arranged in a first line and outputs of the phase difference detection pixels arranged in a second line adjacent to the first line depending on whether or not an imaging condition satisfies a predetermined condition, set, as the first line, the line in which the phase difference detection pixels having the phase difference characteristics corresponding to an exit pupil distance of a lens are arranged, and acquire the exit pupil distance of the lens by communication.

9. A signal processing method comprising:

acquiring, by a controller, distance measurement information on a basis of an addition value obtained by adding together outputs of a plurality of phase difference detection pixels supplied from an imaging element in which the plurality of phase difference detection pixels is arranged, the plurality of phase difference detection pixels respectively having different phase difference characteristic, adding together the outputs of the phase difference detection pixels arranged in a first line and outputs of the phase difference detection pixels arranged in a second line adjacent to the first line depending on whether or not an imaging condition satisfies a predetermined condition, setting, as the first line, the line in which the phase difference detection pixels having the phase difference characteristics corresponding to an exit pupil distance of a lens are arranged, and acquiring the exit pupil distance of the lens by communication.

10. A non-transitory computer readable medium storing program code for signal processing, the program code being executable by an electronic processor to perform operations comprising:

acquiring, by a controller, distance measurement information on a basis of an addition value obtained by adding together outputs of a plurality of phase difference detection pixels supplied from an imaging element in which the plurality of phase difference detection pixels is arranged, the plurality of phase difference detection pixels respectively having different phase difference characteristic, adding together the outputs of the phase difference detection pixels arranged in a first line and outputs of the phase difference detection pixels arranged in a second line adjacent to the first line depending on whether or not an imaging condition satisfies a predetermined condition, setting, as the first line, the line in which the phase difference detection pixels having the phase difference characteristics corresponding to an exit pupil distance of a lens are arranged, and acquiring the exit pupil distance of the lens by communication.

11. The imaging device according to claim 8, wherein the imaging condition is luminance, and the controller adds together the outputs of the phase difference detection pixels different in the phase difference characteristic in a case where the luminance is smaller than a threshold value.

12. The imaging device according to claim 8, wherein the second line includes one or two lines.

13. The imaging device according to claim 8, wherein the controller, in a case where the imaging condition satisfies the predetermined condition, at least adds together the outputs of the phase difference detection pixels arranged in the first line and the outputs of the phase difference detection pixels arranged in the second line adjacent to the first line, and in a case where the imaging condition does not satisfy the predetermined condition, uses the outputs of the phase difference detection pixels arranged in the first line, to acquire the distance measurement information.

14. The imaging device according to claim 8, wherein opening positions of the phase difference detection pixels are made different depending on the difference in the corresponding exit pupil distances.

15. The imaging device according to claim 8, wherein a predetermined number of lines as a cycle is formed in the imaging element.

16. The imaging device according to claim 8, wherein the controller divides the addition value by a number of different phase difference characteristics.

17. The non-transitory computer readable medium according to claim 10, wherein the imaging condition is luminance, and the controller adds together the outputs of the phase difference detection pixels different in the phase difference characteristic in a case where the luminance is smaller than a threshold value.

18. The non-transitory computer readable medium according to claim 10, wherein the controller, in a case where the imaging condition satisfies the predetermined condition, at least adds together the outputs of the phase difference detection pixels arranged in the first line and the outputs of the phase difference detection pixels arranged in the second line adjacent to the first line, and in a case where the imaging condition does not satisfy the predetermined condition, uses the outputs of the phase difference detection pixels arranged in the first line, to acquire the distance measurement information.

19. The non-transitory computer readable medium according to claim 10, wherein opening positions of the phase difference detection pixels are made different depending on the difference in the corresponding exit pupil distances.

20. The non-transitory computer readable medium according to claim 10, wherein the controller divides the addition value by a number of different phase difference characteristics.

* * * * *